United States Patent [19]

Pellet et al.

[11] Patent Number: 4,923,594
[45] Date of Patent: May 8, 1990

[54] FLUID CATALYTIC CRACKING PROCESS

[75] Inventors: Regis J. Pellet, Croton; Peter K. Coughlin, Yorktown Heights; Jule A. Rabo, Armonk, all of N.Y.

[73] Assignee: UOP, Des Plaines, Ill.

[21] Appl. No.: 286,289

[22] Filed: Dec. 19, 1988

Related U.S. Application Data

[62] Division of Ser. No. 58,275, Jun. 4, 1987, Pat. No. 4,814,316.

[51] Int. Cl.$^5$ .................... C10G 11/04; C10G 11/05
[52] U.S. Cl. .................................. 208/114; 208/120
[58] Field of Search ................. 208/114, 120; 502/214

[56] References Cited

U.S. PATENT DOCUMENTS

| | | | |
|---|---|---|---|
| 3,368,981 | 2/1968 | Plank et al. | 252/455 |
| 3,468,815 | 9/1969 | Cole et al. | 252/455 |
| 3,518,206 | 6/1970 | Sowards et al. | 252/446 |
| 3,523,092 | 8/1970 | Kearby | 252/455 |
| 3,810,845 | 5/1974 | Braithwaite et al. | 252/455 |
| 4,088,605 | 5/1978 | Rollman | 252/455 |
| 4,197,186 | 4/1980 | Short et al. | 208/120 |
| 4,203,869 | 5/1980 | Rollman | 252/455 |
| 4,212,771 | 7/1980 | Hamner | 252/455 |
| 4,222,896 | 9/1980 | Swift et al. | 252/437 |
| 4,228,036 | 10/1980 | Swift et al. | 252/437 |
| 4,440,871 | 4/1984 | Lok et al. | 208/114 |
| 4,512,875 | 4/1985 | Long et al. | 208/114 |
| 4,567,029 | 1/1986 | Wilson et al. | 208/114 |
| 4,724,066 | 2/1988 | Kirker et al. | 208/28 |
| 4,735,806 | 4/1988 | Flanigen et al. | 502/214 |
| 4,744,885 | 5/1988 | Messina et al. | 208/114 |
| 4,764,269 | 8/1988 | Edwards et al. | 208/114 |
| 4,814,316 | 3/1989 | Pellet et al. | 502/214 |

FOREIGN PATENT DOCUMENTS

| | | | |
|---|---|---|---|
| 0161818 | 4/1985 | European Pat. Off. | 423/306 |
| 0158348 | 10/1985 | European Pat. Off. | 423/306 |
| 0158350 | 10/1985 | European Pat. Off. | 423/306 |
| 0158975 | 10/1985 | European Pat. Off. | 502/214 |
| 0158976 | 10/1985 | European Pat. Off. | 502/214 |
| 0159624 | 10/1985 | European Pat. Off. | 502/214 |
| 0161488 | 11/1985 | European Pat. Off. | 502/214 |
| 0161489 | 11/1985 | European Pat. Off. | 502/214 |
| 0161490 | 11/1985 | European Pat. Off. | 423/306 |
| 0161491 | 11/1985 | European Pat. Off. | 502/214 |
| 2048299 | 12/1980 | United Kingdom | 423/306 |

OTHER PUBLICATIONS

Flanigen et al., paper entitled, "Aluminophosphate Molecular Sieves and the Periodic Table", published in the New Developments in Zeolite Science and Technology, Proceedings of the 7th International Zeolite Conference, edited by Y. Murakami, A. Iijima and J. W. Ward, pp. 103-112 (1986).

Rastelli et al., The Canadian Journal of Chemical Engineering, 60, pp. 44-49, Feb. 1982.

Lok et al., Jurnal of the American Chemical Society, 1984, 106, pp. 6092-6093

Primary Examiner—Anthony McFarlane
Attorney, Agent, or Firm—Thomas K. McBride; Vincent J. Vasta, Jr.

[57] ABSTRACT

A fluid catalytic cracking process comprising contacting a crude oil feedstock with a fluid catalytic cracking catalyst comprising a microporous crystalline multicompositional, multiphase composite of SAPO-37 molecular sieve as a phase thereof in contiguous relationship with a different microporous faujasitic crystalline molecular sieve as another phase thereof.

1 Claim, 5 Drawing Sheets

FLUID CATALYTIC CRACKING PROCESS

This application is a division of prior U.S. application Ser. No. 058,275, filing date June 4, 1987, now U.S. Pat. No. 4,814,316.

This application is also related to copending applications, Ser.Nos. 58,259, 58,241, and 58,121, commonly assigned and filed on even date herewith.

BRIEF SUMMARY OF THE INVENTION

The invention is directed to the manufacture of multi-compositional, multiphase molecular sieve catalysts which have unique attributes in facilitating the cracking of oil by fluid bed cracking and to the cracking processes.

BRIEF DESCRIPTION OF THE DRAWING

The figures graphically depict the MAT performance of FCC catalysts made from a composite of this invention to the MAT performance of FCC catalysts made from molecular sieves used in making the composite, in respect to gasoline selectivity vs conversion (FIG. 1), gas yield vs conversion (FIG. 2), coke yield vs conversion (FIG. 3), aromatic yield vs conversion (FIG. 4) and naphthenes and olefins vs conversion (FIG. 5).

DETAILED DESCRIPTION OF THE INVENTION

Background to the Invention

Figure 1:
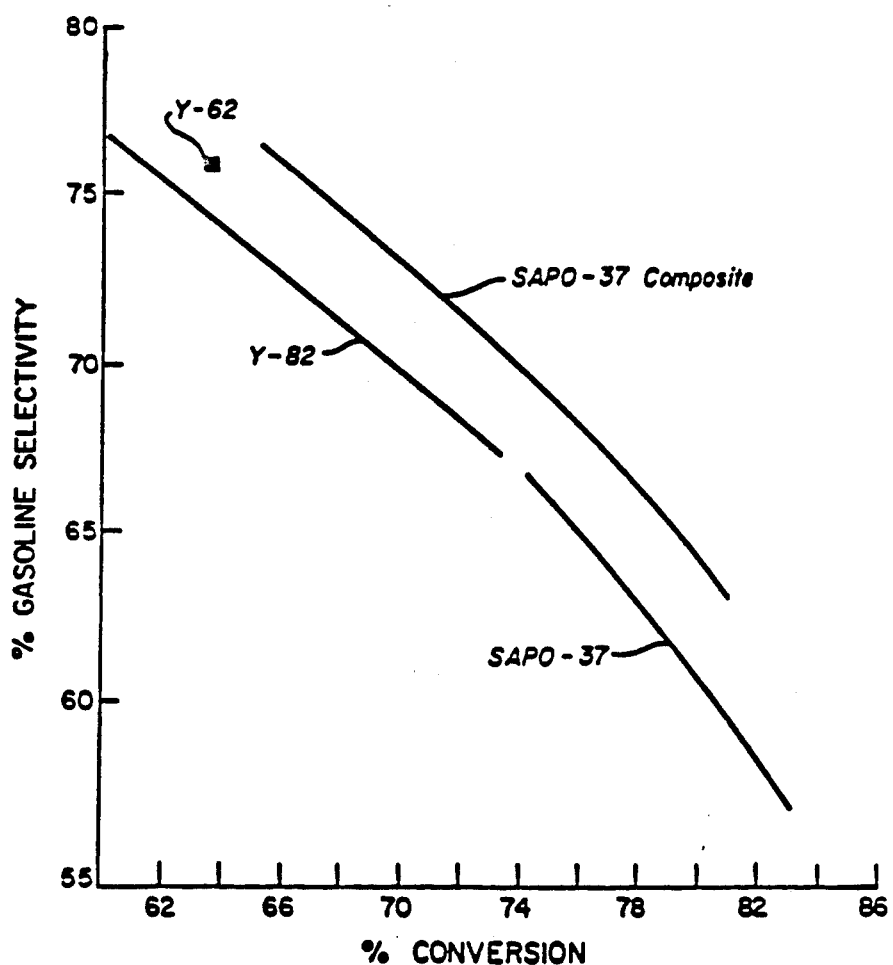

Prior Art:

There is a phenomenon in heterogeneous catalysis characterized as tortuous diffusion. It involves the passage of gaseous or liquid reactant and reaction product(s) in the porous network of a solid heterogenous catalyst. Tortuous diffusion contemplates contact of the gaseous or liquid reactant and reaction product(s) with the catalytic agent in the porous network of the catalyst for a period longer than the prescribed residence time of the reactants and reaction product(s) in a bed of the catalyst. The length of contact time of the reactants and the reaction product(s) within the catalyst is dependent on the complexity of the porosity and the size of the pores. Catalysts with high surface areas provide a substantial porosity and the reactants or reaction product(s) have a relatively lengthy stay within the catalyst, longer than the calculated residence time. If the reactants and/or the reaction products are capable of generating undesirable products with such passage of time, then a considerable drop in the efficiency of the reaction will occur. One way to avoid the adverse effects of tortuous diffusion is to create a catalyst with low surface area, that is, a solid catalyst which has relatively few pores and a significant number of them are large. However, this cannot be effectively done with all catalysts. Some cannot be effective or exist as a low surface area structure.

There is described herein a novel multi-compositional catalyst which provides a structure for controlling the tortuous diffusion factor in the FCC process. It comprises a special class of non-zeolitic molecular sieve catalysts which have immutable crystalline microporous structures.

Faujasite is a naturally occurring zeolite. Its properties, chemistry and structure are well documented, see, e.g., Breck, Zeolite Molecular Sieves, published by John Wiley & Sons, New York, N.Y., 1974, pages 49, 92–107, 145, 218, 254, 625. Another class of zeolites are called faujasite-type zeolites. Illustrative members of the class are the X and Y synthetic zeolites, see Breck, supra, at pages 49 and 92–107. According to Breck, at page 92:

"Zeolites X and Y and faujasite have topologically similar aluminosilicate framework structures, although they are distinct zeolite species with characteristic differences."

For the purposes of this invention and the discussion herein, those molecular sieves which are crystalline, microporous and have a framework structure which is topologically similar to faujasite will be termed "faujasitic". As will be pointed out in greater detail below, there are a variety of molecular sieves that are not compositionally zeolites that can be classed as faujasitic. They are included as faujasite-types as well.

New families of crystalline microporous molecular sieve oxides have been recently patented or filed on (by the filing of patent applications), see Table A below, that are based on the presence of aluminophosphate in the framework of the crystal structures. These molecular sieves are actually not zeolites[1] because they are not aluminosilicates and many possess novel crystal structures relative to the known zeolites while others possess framework structures comparable in topology to certain zeolites. For convenience, they are herein characterized as members of the family of "non-zeolitic molecular sieves" which family is generically referred to by the acronym "NZMS". A list of the patents and patent applications covering certain of the NZMSs, and a description of their subject matter, is set out in Table A below. The manufacturing procedures of these new families are employed in the practice of this invention.

[1] According to J. V. Smith, Amer. Mineral Soc. Spec. Paper (1963) 1, 281: "a zeolite is an aluminosilicate with a framework structure enclosing cavities occupied by large ions and water molecules, both of which have considerable freedom of movement, permitting ion-exchange and reversible dehydration." See J. Rabo, Zeolite Chemistry and Catalysis, published by the American Chemical Society, Washington, D.C., ASC Monograph 171, 1979, Chapt. 1, p. 3 (J. V. Smith)

Because of the importance of this new family of NZMSs to this invention, it is appropriate to quote from the recent article by Flanigen et al, in a paper entitled, "Aluminophosphate Molecular Sieves and the Periodic Table", published in the "New Developments and Zeolite Science Technology" Proceedings of the 7th International Zeolite Conference, edited by Y. Murakami, A. Iijima and J. W. Ward, pages 103–112 (1986), in respect to the nomenclature of those materials:

"The materials are classified into binary (2), ternary (3), quaternary (4), quinary (5), and senary (6) compositions based on the number of elements contained in the catonic framework sites of any given structure. A normalized $TO_2$ formula represents the relative concentration of framework elements in the composition, $(El_xAl_yP_z)O_2$, where El is the incorporated element and x, y and z are the mole fractions of the respective elements in the composition. Acronyms describing the framework composition are shown in Table 1, e.g., SAPO=(Si, Al, P)$O_2$ composition. The structure type is indicated by an integer following the compositional acronym, an integer following the compositional acronym, e.g., SAPO-5 is a (Si, Al, P)$O_2$ composition with the type 5 structure. The numbering of the structure type is arbitrary and bears no relationship to structural numbers used previously in the literature, e.g. ZSM-5, and only identifies structures found in the aluminophosphate-based molecular sieves. The same structure number is used for a common structure type with varying framework composition."

TABLE 1

| Acronyms for Framework Compositions | | | | | |
|---|---|---|---|---|---|
| $TO_2$, T= | Acronym | $TO_2$, T= | Acronym | $TO_2$, T= | Acronym |
| Si,Al,P | SAPO | Me,Al,P,Si | MeAPSO | Other Elements: | |
|  |  | Fe,Al,P,Si | FAPSO | El,Al,P | ElAPO |
| Me,Al,P | MeAPO | Mg,Al,P,Si | MAPSO | El,Al,P,Si | ElAPSO |
| Fe,Al,P | FAPO | Mn,Al,P,Si | MnAPSO |  |  |
| Mg,Al,P | MAPO | Co,Al,P,Si | CoAPSO |  |  |
| Mn,Al,P | MnAPO | Zn,Al,P,Si | ZAPSO |  |  |
| Co,Al,P | CoAPO |  |  |  |  |
| Zn,Al,P | ZAPO |  |  |  |  |

That nomenclature will be followed in characterizing how a particular phase of the composites of this invention are made. For example, if a phase is made by the procedure for making SAPO-37, then the phase will be characterized as a SAPO-37.

In this specification and the claims hereto, reference is made to "NZMS-37." This refers to that family of non-zeolitic molecular sieve having the 37 structure. The 37 structure correlates in the family of NZMSs those possessing the faujasite structure. Illustrative of these faujasitic materials are the following:

SAPO-37
MeAPSO-37 where Me=Co, Fe, Mg, Mn, Zn
ELAPO-37 where EL=As, Be, B, Cr, Ga, Ge, Li, V, Ti
ELAPSO-37 where EL=As, Be, B, Cr, Ga, Ge, Li, V, Ti It is recognized in the art that the relative acidity of zeolitic molecular sieves can be characterized by their performance in dilute (2 mole %) n-butane cracking, see Rastelli et al., The Canadian Journal of Chemical Engineering, 60, pages 44–49, February 1982. This is true for the NZMS class of molecular sieves. Lok et al., Journal of the American Chemical Society, 1984, 106, 6092–6093. Where reference is made herein and in the claims to the acidity of a molecular sieve, that acidity characterization is in reference to the material's $k_A$ as determined by its dilute n-butane cracking performance as described by Rastelli et al., supra. In broader terms, acidity means activity in acid catalyzed catalytic reactions generally.

The molecular sieves described in Table A and in the Flanigen et al. article, supra, provide unique catalytic and adsorbent capabilities not as such found in other molecular sieves, particularly the zeolitic molecular sieves. They have a broad range of activity. In most instances, they possess very desirable and superior stability in respect to thermal and hydrolytic properties. They are relatively expensive materials to make because of the costlier amine templating agents employed in their manufacture.

U.S. Pat. No. 4,440,871, one of the patents referred to in Table A infra, at col. 8, lines 10–16 states the following:

"While not essential to the synthesis of SAPO compositions, it has been found that in general stirring or other moderate agitation of the reaction mixture and/or seeding the reaction mixture with seed crystals of either the SAPO species to be produced or a topologically similar aluminophosphate or aluminosilicate composition, facilitates the crystallization procedure."

Comparable language may be found in many of the other patents and patent applications cited in Table A below, see the notations in this regard in Table A. Specific references are made to examples in the patents and patent applications cited in Table A where seeding was specifically employed. Many of the patents and patent applications of Table A discuss and disclose the use of aluminophosphate containing molecular sieves as a source of aluminum and/or phosphorus in the manufacture of the molecular sieves. None of the patents and patent applications of Table A mention the formation of composites or the formation of multiphase compositions where the phases are distinct and heterogeneous as to each other. None give an inkling of how much of the final molecular sieve, if any, is the seed or retains the composition of the aluminophosphate used in providing the Al and/or P for sieves composition.

SAPO molecular sieves are a general class of microporous crystalline silicoaluminophosphates. They are described in U.S. Pat. No. 4,440,871, patented April 3, 1984. The pores of the SAPO's have a nominal diameter of greater than about 3 Å. Their "essentially empirical composition" is mR: $(Si_xAl_yP_z)O_2$, where R represents at least one organic templating agent present in the intracrystalline pore system; m has a typical value of from 0 to 0.3 and represents the moles of R present per mole of $(Si_xAl_yP_z)O_2$; x, y and z represent the mole fractions of silicon, aluminum and phosphorus, respectively, present as tetrahedral oxides. The fractions are such that they are within a pentagonal compositional area defined by points A, B, C, D and E of the ternary diagram of FIG. 1 and preferably within the pentagonal compositional area defined by points a, b, c, d and e of FIG. 2, of the drawings of the patent. The SAPO molecular sieves have a characteristic x-ray powder diffraction pattern which contains at least the d-spacings set forth in any one of Tables I, III, V, VII, IX, XI, XIII, XV, XVII, XIX, XXI, XXIII or XXV of the patent. Further, the as-synthesized crystalline silicoaluminophosphates of the patent may be calcined at a temperature sufficiently high to remove at least some of any organic templating agent present in the intracrystalline pore system as a result of such synthesis. The silicoaluminophosphates are generally referred to therein as "SAPO", as a class, or as "SAPO-n" wherein "n" is an integer denoting a particular SAPO as its preparation is reported in the patent. This invention includes the application of one of the SAPO's, specifically the faujasitic SAPO-37. Though the SAPO's are taught to be useful in petroleum cracking and hydrocracking, there is no specific reference to their use in fluid catalytic cracking in U.S. Pat. No. 4,440,871.

Discussion of Fluid Catalytic Cracking:

Fluid catalytic cracking is a primary source for the production of gasoline in the United States. It is generally practiced by circulating a catalyst in contact with the feedstock, typically vacuum gas oil, in the riser reactor portion of the cracker. The temperature of the riser reactor is about 500° C. (932° F.). The reaction is achieved within seconds. The reaction is completed by the time the feed and catalyst reaches the reactor temperature. The catalyst is separated from the product stream in a stripper and then fed to a regenerator where the catalyst is heated with air and steam at a temperature of about 760° C. (1400° F.). The regenerated catalyst is reintroduced to the reaction feed stream. The cracking reaction generates the following products: gasoline, light cycle oil, heavy cycle oil, coke and gas. Approximately 60 volume % of the product is gasoline, about 20 volume % is light cycle oil, about 10 volume % is heavy cycle oil, about 4–6 weight % is coke and the remainder is gas. The selectivity of the process is measured by the gasoline or gasoline and light cycle oil produced from the feed (vacuum gas oil) introduced as a reactant.

Essentially all of the FCC catalysts employed today contain a zeolite as the cracking catalyst. Approximately 98% of these zeolites are zeolite-Y types. Zeolite-Y has a faujasite crystallographic framework. It is aluminosilicate produced by the hydrocrystallization of aluminate and silicate raw materials. A specific illustration for their manufacture and their performance can be found at Chapter 11, Pages 615–664 of Rabo, supra.

Some of the commercial FCC Y-type zeolites contain significant amounts, as much as 18-weight percent or more, of calcined rare earth oxides. They are known by the acronym "CREY". Another particularly desirable cracking catalyst is stabilized Y, known as USY or Y-82.

In the process of using the catalyst, the catalyst is subjected to a significant amount of steam treatment at temperatures up to 760° C. and above in the regenerator typically in the presence of air. The regenerator temperature is much higher than the temperature in the reactor. The purpose of the steam and air treatment is to aid in the regeneration of the catalyst by the combustion of coke which is deposited in the cracking reaction step.

The necessity of removing coke efficiently from the catalyst requires the catalyst to have outstanding thermal and hydrothermal stability. The severe conditions of the process requires an extremely sturdy composition. These catalysts typically have a life span of about three to six months.

Extremely important to the FCC process are the issues of residence time in the reactor and tortuous diffusion existing within the zeolite crystallites of 1–5 micron size with about 8 Å pores. The cracking process is carried out at high temperatures in the presence of acidic crystallites of the catalyst (zeolite Y). If the reactant spends too much time with and within the catalyst, there occur the undesirable secondary reactions discussed above, generating such unwanted by-products as coke and gas. In addition, the octane value of the gasoline suffers. Tortuous diffusion of the feed and reaction product in the catalyst crystals increases the contact time for a large fraction of the molecules present, and such reduces the ability to rely upon space velocity, an engineer's tool to establish residence time, as a clearly defined process parameter. The sensitive nature of the activity of the catalyst to the overall ability of the catalyst to selectively produce the gasoline product can only in part be determined by correlating the acidity of the catalyst with the process conditions, including the residence time, catalyst/oil ratio, and the like. Some catalyst, by their nature, will generate more coke while others will generate more gas. The role of tortuous diffusion to the results obtained requires consideration in correlating process conditions.

Octane ratings have emerged in recent years to be important technical issues in the manufacture of gasoline. With the evolution of unleaded gas as a national criteria in the United States, it has become desirable to achieve gasoline in the FCC process with the highest possible octane rating.

Much FCC produced gasoline is employed in the United States for blending to enhance octane. Recent studies indicate that FCC accounts for nearly 35% of the gasoline produced in the United States. FCC gasoline has an octane rating of about 86.5–87.5 whereas the United States gasoline octane pool has an octane rating of about 85.9. This difference in octane is viewed as significant. It follows that the FCC gasoline is very useful in enhancing the octane rating of other lower octane gasoline sources. To achieve the lead phase out mandated by the EPA, and increase the United States gasoline octane pool rating to greater than 88 to meet the automotive requirements, it will be necessary to rely extensively on components which would enhance a gasoline's octane rating that are produced by such refinery processes as reforming, isomerization, alkylation and FCC.

Current octane enhancing FCC catalysts typically rely on steam stabilized Y zeolite (frequently called "USY") containing catalysts. USY or US-Y are acronyms for ultra stable Y. Their properties and manufacture are described at pages 102, 164, 249 and 318–329 of Rabo, supra. When USY is compared in performance to calcined rare earth Y (CREY) zeolites, the more extensively used gasoline catalyst, USY provides an improvement in octane plus a reduction in coke make. It appears that USY is not as effective as CREY in providing gasoline selectivity. A loss in gasoline selectivity (yield) is typically accompanied by increased gas (as contrasted to liquid) make. In addition, USY based catalysts rapidly deactivate in steam, an unavoidable environmental condition that a FCC catalyst is subjected to in gasoline manufacture. Consequently, USY becomes less active than CREY catalysts in a short time. Activity of USY can be improved by using higher USY concentration in the catalyst, but this is costly and results in catalysts with reduced attrition resistance. The alternative is to apply small amounts of rare earth by cation exchange; however, such catalysts produce lower octane gasoline.

USY catalysts are superior to CREY catalysts because they generate gasoline which is significantly richer in olefins and somewhat lower in aromatics. The higher olefins content causes higher octane ratings. Improved olefinicity is associated with reduced acid site concentration and lower polarity for USY zeolites in FFC use resulting in lower hydrogen transfer activity relative to CREY based catalysts. Hydrogen transfer consumes olefins and produces paraffins and aromatics according to the following equation:

$$3 \text{ olefins} + 1 \text{ naphthenes} \rightarrow 3 \text{ paraffins} + 1 \text{ aromatic}$$

Both the olefins and aromatics are high octane gasoline components but since three olefins are destroyed to produce one aromatic molecule, a net octane loss results by this hydrogen transfer reaction. The CREY containing catalysts have the highest acid site concentration in the FCC environment as well as reactant concentration, each of which leads to higher H− shift rates. USY, presteamed to reflect the extended exposure to FCC conditions, transforms to zeolitic molecular sieve products which are extremely "low" in both acid site concentration and in reactant concentration. Thus USY FCC catalysts, by lacking this secondary hydride shift activity, produce a more olefinic and higher octane gasoline than is produced using the CREY containing catalysts. See Rabo, Unifying Principles in Zeolite Chemistry and Catalysis, *Catal. Rev.-Sci. Eng.*, 23 (1 & 2), pp. 293–313 (1981).

USY containing catalysts produce higher octane gasoline in lower yields due to increased secondary cracking activity whereas CREY containing catalysts produce higher gasoline yields but with lower octane due to enhanced hydrogen transfer, another secondary reaction. It would be desirable to achieve the desirable features of each of these catalysts and none of their deficiencies by reducing both types of secondary reactions.

Summary of the Invention

This invention relates to novel fluid catalytic cracking catalysts and to their use in FCC processes. The novel FCC catalysts comprise a microporous crystalline multi-compositional, multiphase composite of a NZMS-37 (especially SAPO-37) as a phase thereof in contiguous relationship and combination with one or more of different microporous crystalline faujasitic molecular sieves, and the composite exhibits a distinct heterogeneity in composition of one phase to another therein.

This invention comprises a novel fluid catalytic cracking (FCC) catalyst which contains a microporous crystalline multi-compositional, multiphase composite particulate material as a component thereof. The FCC composite catalyst of the invention desirably contains at least 50 weight percent, preferably at least 75 weight percent, more preferably at least 95 weight percent, and most preferably (and usually) 100 percent, of a multiphase composite comprising different inorganic microporous crystalline molecular sieve compositions as phases thereof, wherein at least one phase is grown by crystal growth in the presence of another phase, in which:

(a) the different phases are contiguous and have a common crystal framework structure;

(b) at least one phase is a NZMS-37 (especially SAPO-37) composition and structure, and (c) the composite exhibits a distinct heterogeneity in composition of one phase to another therein. The remainder of the composition comprises, as derived from the composite manufacture, independent particles which are wholly made of a molecular sieve which is of the composition and framework structure of one or more phases of the composite.

This invention, in another aspect, is directed to a multiphase composite comprising different inorganic microporous crystalline compositions, preferably molecular sieve compositions, as phases thereof wherein at least one phase comprises a deposition substrate upon which another phase is deposited as an outer layer or there are multiple phases jointly formed (such as by differential crystallization), in which:

(a) the different phases are contiguous and have a common crystal framework structure;

(b) at least one phase is a NZMS-37 (especially SAPO-37) composition and structure, and (c) the phase comprising the deposition substrate or one of the phases jointly formed constituting the deposition substrate contains at least about 20 weight percent of the total weight of the phases making up the composite.

Of the foregoing catalyst compositions, it is desirable that one of the phases is less acidic than another of the phases.

In a preferred embodiment, the composite material is a particulate structure in which at least one of the different microporous crystalline faujasitic molecular sieves is a less acidic molecular sieve under the reaction conditions and constitutes the core component and a more acidic NZMS-37, such as SAPO-37, envelopes the less acidic core component, as a sheath or shell therefor. It is not critical that the more acidic NZMS-37, such as SAPO-37, totally envelop the core component, though it is desirable that it does. Desirably, the catalytic composite is embedded in a matrix material which is relatively inert to the cracking reaction and provides diffusion accessability, and the like considerations, to the catalyst.

This invention also embraces a process for making the composite structures and processes for using the same, especially as an FCC catalyst. The process for making the composite structures involves the growth of a crystalline structure constituting either phase in the presence of crystals of another of such a phase. The process involves the growth of a crystalline NZMS-37, especially SAPO-37, constituting such a phase in the presence of crystals of a different microporous crystalline faujasitic molecular sieve by a hydrothermal crystallization treatment of the precursors to such phase such that the different microporous crystalline faujasitic molecular sieve phase is present therein in an amount of at least about 20 weight percent of the total of the phases of the composite.

Details of the Invention

The invention relates to unique FCC catalyst structures that are believed to reduce the adverse reaction products generated by tortuous diffusion of the petroleum feed and/or the products of the reaction within conventional FCC catalyst structures. It is a contemplation of the invention to define special multi-compositional, multiphase FCC catalysts in which the adverse effects of tortuous diffusion are attacked by the selection of the composition of the phases and their placement in the structure of the catalyst such that the feed can be primarily subjected to a particular compositional phase. It is a further contemplation of the invention to create special catalysts in which the placement of the phases within the catalyst is predicated on the activity of the composition of the phase. The invention also contemplates the tailoring of the compositions of the multi-compositional, multiphase composites such that the maximum benefits of a catalytic phase can be achieved.

This invention is directed to a FCC catalyst which prior to use or during use has a composite structure which is wholly crystalline.[2] Though the microporous composite may be composited with amorphous materials in a physical sense, viz. adhesive bonding rather than covalent bonding, and such is also part of this invention, the microporous crystalline composite is wholly "crystalline" as that term is understood in this art and constitutes an unified crystalline structure. The crystalline composite of this invention comprises multiple phases, at least one of which contains NZMS-37 as part of the crystal framework structure of the phase in question and another of which contains a different microporous crystalline faujasitic molecular sieve as part of the crystal framework structure of the phase in question.

[2] During steaming, the composite structure loses some of its framework structure resulting in a loss of some of the crystalline constituency, but not all of it.

The composite structure of this invention is faujasitic in that the various phases comprise microporous crystalline molecular sieve compositions which are faujasitic.

This invention is directed to composites in which a NZMS-37, especially SAPO-37, molecular sieve is in integral lattice association[3] with another structurally compatible microporous inorganic material, inclusive of the other NZMS-37 molecular sieves contemplated by the prior art set forth in Table A below.

[3] It is believed that the integral lattice association (viz. an epitaxial alignment) of the composites of this invention involves a direct chemical linkage between the phases constituting the composite.

The crystalline composite of this invention comprises multiple phases, at least one of which is a NZMS-37 which contains aluminum and phosphorus as part of the crystal framework structure of the phase in question. That means, from a composition standpoint, the unit structure

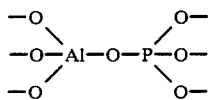

is present in the crystal framework of the phase.

In the preferred compositional embodiment of the invention, the crystalline composite of this invention comprises multiple phases, at least one of which contains faujasitic silicoaluminophosphate as part of the crystal framework structure of the phase in question. That means, from a composition standpoint, the unit structures

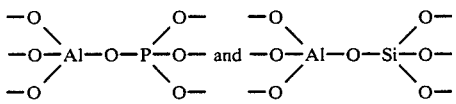

are present in the crystal framework of the phase.

Another aspect of the invention provides that the various phases of the composite are integrally bonded to each other by epitaxial growth of one crystal surface from another such that the crystal structures of the phases yield a composite of a common single crystal structure even though the composite has a heterogeneous chemical composition. In that sense, the phases are substantially crystallographically indistinct from one another. As pointed out above, the phases of the composites are in integral lattice association with each other. It is believed that the phases are joined together by direct chemical linkages. The phases of the composites of this invention are not simple blends or physical mixtures that are bonded together by an adhesive generated by a third component which fails to satisfy the crystallographic characterization of the phases and their epitaxial relationships in the composites of this invention.

The relationship of the phases to each other is that they each possess essentially the same faujasite crystalline framework structure. In practical terms, this means that the X-ray diffraction patterns for the composite of the multiple phases is the same (in terms of $2\theta$ values) in essential details. Of course, the intensities of the peaks are dependent on the composition of the phases. Though it is possible for each of the phases to have different X-ray diffraction patterns, the differences should be slight enough that in essential crystallographic terms one would regard the different structures to be framework compatible and of the faujasite family. This is intended to mean that the various phases have crystalline structures which mimic each other in terms of framework topology.

This invention is directed to the use of a sufficient amount of a phase within a NZMS-37 containing multiphase composite that the compositional heterogeneity of the various phases are maintained. When utilizing one phase as a deposition substrate for another phase, the deposition substrate must be present in the ultimate composite in such an amount that it retains its identity as a distinct compositional phase within the composite, that is, the composite is clearly composed of phases which are compositionally heterogeneous with each other but are topographically compatible with each other. This is regarded, in characterizing this invention, as providing that a deposition substrate constitutes at least about 20 wt. % of the total weight of the phases making up the composite. In other words, the language "of at least about 20 wt. %" is intended to mean that the amount of the deposition substrate phase present in the composite is sufficient for it to have a separate and distinct heterogeneous compositional identity vis-a-vis the other phases of the composite.

The nature of the deposition of one phase upon the other in the composite is believed to be that of a layer of a phase upon the surface of another phase. In such a representation, the deposited layer is termed herein the "outer layer" and the substrate phase providing the deposition surface is termed the "deposition substrate." This terminology holds even though more than two phases exist in the composite.

Crystalline molecular sieves, whether zeolites or of the NZMS variety, are formed as small crystals ranging in size from about 0.1 microns ($0.4 \times 10^{-5}$ inch) to about 75 microns (0.003 inch) in diameter usually between 0.1-10 microns. The spread in particle size for any particular molecular sieve is about 10 microns in diameter. Crystalline molecular sieves are not spheres, they can range from regularly to irregularly shaped structures in the fashion of most crystals. Many are formed as part of agglomerations of crystals.

It has been determined that much of the benefits of NZMSs as catalysts are achieved in the outer surface portion (mantle) of the sieve particle. Where a NZMS is employed as a catalyst in a chemical reaction in which irreversible secondary reactions occur that generate by-products, much of the primary reaction occurs in the outer mantle and much of the secondary reaction(s) occurs in the core area of the molecular sieve particle. This phenomena is believed to be, to a large extent, the product of the toruous diffusion of the adsorbate(s) through the core of the molecular sieve particle which increases the adsorbate(s)'s contact with the catalyst.

This extra contact with an active catalyst phase results in undesired secondary reaction(s) being promoted.

The efficiency or selectivity of a chemical reaction is measured by the ability of the catalyst to generate the primary reaction product(s) while avoiding or minimizing the formation of the irreversible (in the context of the reactions) secondary reaction product(s). In this context, it should be appreciated that a secondary reaction product is considered an undesired by-product of the reaction. This invention is directed to providing NZMS-37, especially SAPO-37, containing catalysts that achieve enhanced efficiencies or selectivities to the primary reaction product(s) while minimizing the adverse secondary reactions.

This invention provides for an absorbent particulate NZMS-37 containing composite composition that possesses a differentiation in catalytic activity and/or selectivity within the particle at different parts thereof. This is accomplished through selection of the composition of the phases of the composite and the nature of their placement in the composite's structure. If the core of the composite is made of a phase that is less active than the layer or phase surrounding it, then the reaction product of a tortuous diffusion of reactant to the core will result in less secondary reaction products being formed than if the whole particle were made of the composition of the surrounding layer. Higher selectivities are the result.

In the context of this invention, apart from the cracking reaction, the primary reaction is the incremental change in the composition of the gasoline fraction generated as a result of using the catalyst of the invention. With that in mind, the efficiency or selectivity of the chemical reaction(s) resulting in the octane enhancement is measured by the ability of the catalyst to generate the primary reaction product(s) while avoiding or minimizing the formation of the secondary reaction product(s) such as the formation of gaseous hydrocarbons and the hydride shift reaction. In this context, it should be appreciated that a secondary reaction product is considered an undesired by-product of the reaction which tends to lower octane rating and yield of the gasoline. This invention is directed to providing catalysts and processes that achieve enhanced efficiencies or selectivities to the primary reaction product(s) which reflect an enhancement in octane rating of the gasoline product while minimizing the secondary reaction product(s) which would impair such octane enhancement.

The cracking catalysts of this invention comprises a sufficient amount of a NZMS-37 phase, such as a SAPO-37 phase, within a multiphase composite that the compositional heterogeneity of the various phases are maintained. When utilizing one or more phases as a deposition substrate for another phase such as SAPO-37, the deposition substrate must be present in the ultimate composite in such an amount that it retains its identity as a distinct phase within the composite, that is, the composite is clearly composed of phases which are compositionally heterogeneous with each other but are topologically compatible with each other. This is regarded, in characterizing this invention, as providing that a deposition substrate constitute at least about 20 wt. % of the total weight of the phases making up the composite. In other words, the language "of at least about 20 wt. %" is intended to mean that the amount of the deposition substrate phase present in the composite is sufficient for it to have a separate and distinct heterogeneous compositional identity vis-a-vis the other phases of the composite.

The invention also encompasses an octane enhancing cracking catalyst which involves a heterogeneous mixture comprising:
(A) a multiphase composite comprising different inorganic crystalline molecular sieve compositions as phases thereof wherein at least one phase is grown by crystal growth in the presence of another phase, in which:
  (a) the different phases are contiguously aligned to each other and possess a common crystal framework structure;
  (b) one of the phases, preferably the outer layer or the mantle phase, comprises a NZMS-37 such as SAPO-37 and
  (c) the composite exhibits a distinct compositional heterogeneity of one phase to another therein;
(B) an inorganic crystalline composition which is not so contiguously aligned and not sharing a common crystal framework structure with the multiphase composite of (A), but is bonded to the multiphase composite of (A), or
(C) an amorphous composition composition which is bonded to the multiphase composite of (A) and/or (B).

The aforementioned heterogeneous mixture may contain amorphous catalyst matrix material which allows the configuration of the mixture to a shape and size for effective catalytic cracking processing.

In characterizing the various phases of the composites of this invention, reference is being made to specific chemical compositions which are already known in the art because the phases (viz. SAPO-37) that are made start with either such a chemical composition already made or utilize a method of manufacture which according to the art would generate such a known chemical composition. This does not mean that the chemical composition generated in the composite is the full equivalent to such characterization. It is believed that whether one starts with an already formed known composition or produces a phase by a procedure which is intended to generate a known composition, that in significant ways the resulting phases in the composite of this invention are different in chemical composition from either the composition initially started with or the intended composition that the procedure was designed to generate. This difference in chemical composition is not reflected in a change in the crystal structure. The significant difference resides in the chemical composition of the interface of the phases. The capacity exists for significant ionic mobility of the extra framework cations during the manufacture of molecular sieves. This generates a significant amount of ion transfer by ion exchange to occur. Where one composition is deposited upon another of a different kind, there is a greater propensity for such ion exchange to occur. Moreover, during the deposition of one phase onto another, there is a propensity for redissolving a part of the deposition substrate by the components of the outer layer causing a chemical change to that portion of the interface which nominally belongs to the deposition substrate. Frequently, this change at the interface constitutes a chemicals redistribution between the components of the outer layer being deposited and the deposition substrate which is redissolved. Because one is dealing in atomic layers, the degree of compositional alteration is quite small and does not constitute a gross alteration of the composition of any particular phase. Consequently, there is not seen in the framework composition enough changes in the chemical composition of a phase such that by nuclear magnetic resonance ("NMR") one can detect a dramatic compositional change in the framework sites of one phase to another. Even though such a change occurs, the crystal structure is predictable and accords with the known crystal structure of the deposition substrate and that which is expected for the outer layer. However, one cannot state with certainty the exact chemical composition of each of the phases of the composites of the catalysts of this invention.

The foregoing serves to characterise the compositional differences between the phases of the composites of the catalysts of this invention from the compositions which have been specially prepared in prior art. Thus, e.g., a SAPO-37 phase in the catalyst of this invention is not completely identical to a SAPO-37 made in accordance with examples 42, 43 and 44 of U.S. Pat. No. 4,440,871.

The NZMS-37s are discussed above. They include the following compositions:
SAPO-37
MeAPSO-37 where Me=Co, Fe, Mg, Mn, Zn
ELAPO-37 where EL=As, Be, B, Cr, Ga, Ge, Li, V, Ti
ELAPSO-37 where EL=As, Be, B, Cr, Ga, Ge, Li, V, Ti The more preferred of them for use as a more active outer layer under reaction conditions are silicoaluminophosphates such as SAPO-37, the MeAPSO-37s and the ELAPSO-37s. As pointed out below in respect to a preferred embodiment of the invention, any of the NZMS-37s that are less active (acidic) than the outer layer can be used as the deposition substrate phase.

In a preferred embodiment of the invention, one of the phases, desirably an outer layer phase, has the composition of a NZMS-37 which is more acidic than the faujasitic molecular sieve constituting the deposition substrate therefor. The relative acidities of the NZMS-37s and the faujasitic zeolites can be determined by comparing their $k_A$ under the conditions of use. For example, many of the Y zeolites are much more acidic than, e.g., SAPO-37, but when the Y zeolites such as USY is subjected to the steaming conditions of the FCC process, its acidity and activity are materially reduced to a level below that of SAPO-37. Consequently, SAPO-37 in that circumstance is the outer layer and the Y zeolite is used effectively as the deposition substrate. The demonstrated improvement in octane rating resulting from the use of the multi-compositional, multiphase composite FCC catalysts of the invention in which the phase compositions are such that there exists a differential in acidity from one phase to another illustrates the point that one of the phases, especially the deposition substrate, need not be inactive in order to reduce the secondary reactions accompanying tortuous diffusion. However, it would seem that the greater the differential in acidity between the appropriately placed phases, the greater is the reduction in secondary reactions generated by tortuous diffusion.

Thus a particularly desirable embodiment of this invention involves the use of a relatively inexpensive crystalline molecular sieve for the deposition substrate, and a high performance and more costly NZMS-37, especially SAPO-37 molecular sieve, for another phase. It has been determined that the composite exhibits the properties of the costlier component at a much reduced cost. In some cases, the composite provides better performance on a NZMS-37 weight basis than the NZMS-37 alone in a variety of respects. Because the composite is superior to the individual NZMS-37 in most respects, and is superior to the less costly molecular sieve component in almost all respects, the composite yields a synergistic benefit unexpected in the field of catalysis, especially in FCC catalysis.

In the typical case, the outer layer will weigh less than the deposition substrate. This is because in the case of this invention, it is desirable that the outer layer contain a more active NZMS-37 containing phase where such is the most operative catalytic component of the composite. In the practical application of this invention, it will be desirable to combine a relatively inexpensive zeolitic molecular sieve with the more costly NZMS-37 molecular sieve. Such zeolitic molecular sieves are produced in large volumes, therefore it will be desirable to employ a commercial (preformed) zeolite in making the composite. It follows that such is a logical choice for the deposition substrate. Those facts coupled with the surprising benefits obtained from using smaller amounts of NZMS-37 outer layer conveniently coincide with the desire to use the minimum amount of the more costly NZMS-37 containing phase. Consequently, a desirable FCC catalyst of this invention employs a smaller weight amount of the outer layer relative to the weight of the deposition substrate. However, it is to be appreciated that the invention includes the formation of such composites where a NZMS-37 phase is combined epitaxially with an equally or more costly non-zeolitic molecular sieve, by the techniques herein described, or combined with a ternary or quaternary composite comprising one or more NZMS-37 with one or more zeolitic molecular sieve and/or one or more non-zeolitic molecular sieves. Some of the non-zeolitic molecular sieves have excellent stability, and such a property could generate a NZMS-37 containing composite with unique life properties thereby justifying the higher product cost.

In the typical case, the catalytic composite is formed from particles of a preformed and separately made non-SAPO-37 faujasitic molecular sieve and a SAPO-37 phase is deposited thereon as a layer by the hydrothermal crystallization process. This results in a particulate composite in which the initial particle becomes a core that is surrounded or enveloped by SAPO-37. The SAPO-37 thus becomes the initial surface that the petroleum contacts in fluid catalytic cracking. Owing to the relatively smaller, more active catalytic surface that such a deposited SAPO-37 provides as compared to that of a particle of wholly SAPO-37, the differential in catalytic activity between the SAPO-37 phase and the other phase, and the consequent reduction in the adverse impact of tortuous diffusion of the adsorbate(s) in the catalyst particle of the invention, the catalytic effect by the deposited SAPO-37 is more efficient as well as more productive.

The same general effect can be achieved with another active NZMS-37 as a substitute for the SAPO-37 in the foregoing typical case.

The crystal structure of the composites of this invention, or any phase thereof, is determined in accordance with standard analytical procedures of the art. Though the art frequently relies upon X-ray powder diffraction analysis to define or differentiate a molecular sieve from the prior art, it should be appreciated that the characterization of the crystal structure is not solely dependent upon that type of analysis. There are instances where X-ray powder diffraction analysis will not generate a suitable pattern in order to properly characterize the presence of a crystal structure. Such does not mean that the structure is not crystalline. Other procedures can thus be employed to demonstrate the existence of a crystal structure. Indeed, the characterization of a crystal structure is typically determined according to a number of analytical techniques, one of which is X-ray powder diffraction analysis. Such techniques include, by way of example, electron diffraction analysis, molecular adsorption data, and adsorption isotherm characterizations. Some phases used in the composites of this invention may not show a distinctive X-ray powder diffraction pattern adequate for crystal structure characterization. Thus, the combination of techniques allows one to determine the nature of the crystal lattice in which the phase exists. There are cases where the crystal structure is even ill-defined by a combination of techniques, but according to the evidence arrayed, such is characterizable as crystalline by comparison with a particular structure. Such a pseudo-crystalline structure is deemed a crystal for the purpose and understanding of this invention.

The phases of the composites used in the invention relate to each other because they each possess essentially the same crystalline framework structure. In practical terms, this means that the X-ray powder diffraction patterns for the composite (or other evidence of crystallinity) of the multiple phases is the same in essential details other than those affected by changes in the size of different framework cations. Though it is possible for each of the phases to have different X-ray diffraction patterns, the differences should be slight enough that in essential crystallographic terms one would regard the different structures to be framework compatible. This is intended to mean that the various phases have crystalline structures which mimic each other in terms of framework topology.

It is important to recognize that the advantages of the composites of this invention over the single compositions which correspond to the proposed composition of a phase of a composite or blends of such single compositions corresponding to the phases of the composite, resides in the superior performance one may achieve from the use of the composite as a FCC catalyst.

It is preferred that one of the phases of the composites of this invention which constitutes the deposition substrate or the equivalent thereof contains at least 20 weight percent of the total weight of the composite. If one practices the invention with a view to cost reduction in the production of extremely effective FCC catalysts from, e.g., SAPO-37 as the NZMS-37 of choice, or with a view to producing a more effective FCC catalyst from the SAPO-37, it will be desirable to produce composites in which the phase thereof containing the SAPO-37 is present in the minimum acceptable amounts. It has been determined, quite surprisingly, that the performance characteristics at least equivalent to a wholly SAPO-37 non-zeolitic molecular sieve can be achieved in the composite structures of this invention by utilizing substantially less of the SAPO-37 non-zeolitic molecular sieve material and substituting for it in the composition a topographically functional equivalent zeolitic molecular sieve material as the deposition substrate of the composite. It has been determined that if the composite contains at least a phase made of SAPO-37 and at least a phase made of a zeolitic molecular sieve, that the amount of the latter, relative to the former, is preferred to be the predominant amount by weight of the phases making up the composite because the advantages in FCC catalyst properties of the composite is superior to the FCC catalyst properties of SAPO-37 alone and with a material reduction in cost. In another aspect of this invention, one may make composites in which the amount of the deposition substrate phase therein range from at least about 20 weight percent of the total weight of the composite up to about 98 weight percent of the total weight of the composite and the amount of another phase or the other phases constituting the outer layer ranges from at least 80 weight percent of the total weight of the composite down to about 2 weight percent of the total weight of the composite.

In a most preferred embodiment of this invention, the deposition substrate constitutes at least about 50 weight percent of the weight of the composite. Even more preferred is a composite where the deposition substrate is more than 50 to about 98 weight percent of the weight of the composite. Indeed, it is common to employ a SAPO-37 containing composite as a FCC catalyst in which the deposition substrate constitutes from about 60 to about 98 weight percent of the composite. Of course, the remainder of the weight of the composite is the outer layer. In a particularly preferred embodiment, the deposition substrate is faujasite or a faujasite-type zeolitic molecular sieve. In such a case, it will be desirable that the outer layer contain from about 2 to about 40 weight percent of the total weight of the composite, and the remaining weight be that of the less costly molecular sieve, such as a zeolitic molecular sieve.

The proportions cited above hold true using any of the NZMS-37s as the outer layer especially when such is more active than the deposition substrate for the outer layer.

The composites of this invention are made by the hydrothermal crystallization of reactive gel precursors to the crystal structure in the presence of a support surface for crystal growth thereon. The gel precursors depend upon the structure being made. In the case of an aluminosilicate based crystal framework, the precursors are the typical aluminate and silicate compositions employed for making such aluminosilicates. A characteristic of this invention is that each phase may be made by conventional procedures in the art for making the composition of the particular phase. It is usually not necessary to employ a new process for generating a phase in the presence of another phase in order to enjoy the fruits of this invention.

In the case of composites to be made using a zeolitic molecular sieve recipe calling for the use of extremely high pHs, e.g., operating at pH's of 12 or higher, typically more in a pH range of 13–14, such as caused by the use of caustic reagents as sodium hydroxide, it may be necessary that such recipes be used for the manufacture of the deposition substrate and not an outer substrate. Such recipes may cause the decomposition of the deposition substrate and thus the fundamental integrity of the composite when they are used in forming the outer layer. It is desirable to operate at a lower pH using ammonium salts to at least substitute for some of the caustic in the recipe when making outer layers of zeolitic molecular sieve.

The class of non-zeolitic aluminum and phosphorus based molecular sieves are typically synthesized by hydrothermal crystallization of reactive aluminum and phosphorus containing gels containing optionally the additional framework elements and an organic template, at temperatures from about 50° C. (122° F.) to about 250° C. (482° F.), preferably from about 100° C. (212° F.) to about 225° C. (437° F.). The optimum crystallization temperature depends on composition and structure. The AlPO$_4$ and SAPO materials tend not to crystallize at temperatures below about 125° C. (257° F.), whereas several of the MeAPO species crystallize readily at about 100° C. (212° F.).

It is important to appreciate that the composites of this invention may comprise one or more NZMS-37s in combination. Descriptions which are incorporated herein by reference directed to specific classes of the NZMSs employed in this invention and their manufacture can be found in the patents and patent applications set forth in Table A.

TABLE A

| Patent or Pat. Applic. No. | Subject Matter of Patent or Patent Application |
|---|---|
| U.S. Pat. No. 4,567,029 | MeAPO's are crystalline metal aluminophosphates having a three-dimensional microporous framework structure of $MO_2^{-2}$, $AlO_2^-$ and $PO_2^+$ tetrahedral units and having an empirical chemical composition on an anhydrous basis expressed by the formula $mR:(M_xAl_yP_z)O_2$; where R represents at least one organic templating agent present in the intracrystalline pore system; m has a typical value of from 0 to 0.3 and represents the moles of R present per mole of $(M_xAl_yP_z)O_2$; M represents magnesium, manganese, zinc or cobalt, x, y and z represent the mole fractions of M, aluminum and phosphorus, respectively, present as tetrahedral oxides. The fractions are such that they are within a tetragonal compositional area defined by points ABC and D of FIG. 1 of the drawings of the pantent.<br>This patent, at column 6, describes the use of aluminophosphates as a source of phosphorus (lines 26–28) and as a source of aluminum (lines 38–40), and the use of seed crystals to aid in the crystallization of the desired molecular sieve (lines 59–63). Example 85 depicts the use of MAPO-36 as a seed for making MnAPO-36. The chemical composition of the MnAPO-36 fails to reveal the presence of any magnesium. |
| U.S. Pat. No. 4,440,871 | SAPO molecular sieves are a general class of microporous crystalline silicoaluminophosphates. The pores have a nominal diameter of greater than about 3 A. The "essentially empirical composition" is $mR:(Si_xAl_yP_z)O_2$, where R represents at least one organic templating agent present in the intracrystalline pore system; m has a typical value of from 0 to 0.3 and represents the moles of R present per mole of $(Si_xAl_yP_z)O_2$; x, y and z represent the mole fractions of silicon, aluminum and phosphorus, respectively, present as tetrahedral oxides. The fractions are such that they are within a pentagonal compositional area defined by points A, B, C, D and E of the ternary diagram of FIG. 1 and preferably within the pentagonal compositional area defined by points a, b, c, d and e of FIG. 2, of the drawings of the patent. The SAPO molecular sieves have a characteristic x-ray powder diffraction pattern which contains at least the d-spacings set forth in any one of Tables I, III, V, VII, IX, XI, XIII, XV, XVII, XIX, XXI, XXIII of XXV of the patent. Further, the as-synthesized crystalline silicoaluminophosphates of the patent may be calcined at temperature sufficiently high to remove at least some of any organic templating agent present in the intracrystalline pore system as a result of such synthesis. The silicoaluminophosphates are generally referred to therein as "SAPO", as a class, or as "SAPO-n" wherein "n" is an integer denoting a particular SAPO as its preparation is reported in the patent.<br>The U.S. patent speaks at column 8, lines 12–16 of employing seed crystals to generate SAPO species. That technique is |
| described in examples 22, 51 and 53. | |
| U.S. Ser. No. 600,312 filed April 13, 1984, commonly assigned, EPC Publication 159 624, published Oct. 30, 1985 | ELAPSO molecular sieves have the units $ELO_2^n$, $AlO_2^-$, $PO_2^+$, $SiO_2$ in the framework structure and have an empirical chemical composition on an anhydrous basis expressed by the formula:<br>$mR:(EL_wAl_xP_ySi_z)O_2$<br>where "EL" represents at least one element present as a framework oxide unit "$ELO_2^{n}$" with charge "n" where "n" may be $-3$, $-2$, $-1$, 0 or $+1$; "R" represents at least one organic templating agent present on the intracrystalline pore system; "m" represents the molar amount of "R" present per mole of $(EL_wAl_xP_ySi_z)O_2$ and has a value from zero to about 0.3; and "w", "x", "y" and "z" represent the mole fractions of $ELO_2^n$, $AlO_2^-$, $PO_2^+$, $SiO_2$, respectively, present as framework oxide unites. "EL" is characterized as an element having (a) a mean "T-O" distance in tetrahedral oxide structures between about 1.51 A and about 2.06 A, (b) a cation electronegativity between about 125 kcal/g-atom to about 310 kcal/gm-atom and (c) a capability of forming stable M—O—P, M—O—Al or M—O—M bonds in crystalline three dimensional oxide structures having a "m-O" bond dissociation energy greater than about 59 kcal/g-atom at 298° K. "w", "x", "y" and "z" represent the mole fractions of "EL", aluminum, phosphorus and silicon, respectively, present as framework oxides.<br>The "EL" represents at least one element capable of forming a framework tetrahedral oxide and is preferably selected from the group consisting of arsenic, beryllium, boron, chromium, cobalt, gallium, germanium, iron, lithium, magnesium, maganese, titanium and zinc and "w", "x", "y" and "z" represent the mole fractions of "EL", aluminum, phosphorus and silicon, respectively, present as tetrahedral oxides.<br>The EP publication at page 16 discloses the use of crystalline and amorphous aluminophosphate as a source of phosphorus and aluminum and at page 17 describes seeding the reaction mixture. Examples 11A, 12A, 93A-103A, 5B, 6B, 55B, 58B, 59B, 50D-56D, 59D-62D and 12F-15F depict the use of seed crystals. |
| U.S. Pat. No. 4,500,651, patented Feb. 19, 1985 | TAPO molecular sieves comprise three-dimensional microporous crystalline framework structures of $[TiO_2]$, $[AlO_2]$ and $[PO_2]$ tetrahedral units which have a unit empirical formula on an anhydrous basis of:<br>$mR:(Ti_xAl_yP_z)O_2$<br>wherein "R" represents at least one organic templating agent present in the intracrystalline pore system; "m" represents the moles of "R" present per mole of $(Ti_xAl_yP_z)O_2$ and has a value of from zero to 5.0, the maximum value in each case depending upon the molecular dimensions of the templating agent and the available void volume of the pore system of the particular titanium molecular sieve; "x", "y" and "z" represent the mole fractions of titanium, aluminum and phosphorus, respectively, present as tetrahedral oxides.<br>The TAPO molecular sieves are generally further characterized by an intracrystalline adsorption capacity for water at 4.6 torr and about 24° C., of about 3.0 weight percent. The adsorption of water has been observed to be completely reversible while retaining the same essential framework topology in both the hydrated and dehydrated state. The U.S. patent at column 8, lines 65-68, and column 9, lines 15-18, discusses the use of crystalline amorphous aluminophosphate as a source of phosphorus and aluminum. At column 6, lines 1-5, seeding is described as facilitating the crystallization procedure. Comparative example 44 describes a composition of amorphous $TiO_2$ and 95 wt. % $AlPO_4$-18 without an indication of how the composition was prepared. |
| U.S. Ser. No. 600,179, filed Apr. 13, 1984, EPC Publication | The TiAPSO molecular sieves have three-dimensional microporous framework structures of $TiO_2$, $AlO_2^-$, $PO_2^+$ and $SiO_2$ tetrahedral oxide units having an empirical chemical composition on an anhydrous basis expressed by the formula:<br>$mR:(Ti_wAl_xP_ySi_z)O_2$<br>wherein "R" represents at least one organic templating agent present in the intracrystalline pore system; "m" represents |

TABLE A-continued

| Patent or Pat. Applic. No. | Subject Matter of Patent or Patent Application |
|---|---|
| 0 161 488, published Nov. 21, 1985 | the molar amount of "R" present per mole of $(Ti_wAl_xP_ySi_z)O_2$ and has a value of from zero to about 0.3; and "w", "x", "y" and "z" represent the mole fractions of titanium, aluminum, phosphorus and silicon, respectively, present as tetrahedral oxides and each has a value of at least 0.01. The mole fractions "w", "x", "y" and "z" are generally defined in respect to the ternary diagram of FIG. 1 of the applications.<br>The publication, at page 13, describes the use of crystalline or amorphous aluminophosphate as a source of phosphorus and aluminum and, at page 14, points out that seeding the reaction mixture facilitates the crystallization procedure. |
| U.S. Pat. No. 4,554,143 patented Nov. 19, 1985 | Ferroaluminophosphates (FAPO's) are disclosed in U.S. Pat. No. 4,544,143, incorporated herein by reference, and have a three-dimensional microporous crystal framework structure of $AlO_2$, $FeO_2$ and $PO_2$ tetrahedral units and have an essential empirical chemical composition, on an anhydrous basis, of:<br>$mR:(Fe_xAl_yP_z)O_2$<br>wherein "R" represents at least one organic templating agent present in the intracrystalline pore system; "m" represents the moles of "R" present per mole of $(Fe_xAl_yP_z)O_2$ and has a value of from zero to 0.3, the maximum value in each case depending upon the molecular dimensions of the templating agent and the available void volume of the pore system of the particular ferroaluminophosphate involved; "x", "y" and "z" represent the mole fractions of iron, aluminum and phosphorus, respectively, present as tetrahedral oxides. When synthesized the minimum value of "m" in the formula above is 0.02.<br>The iron of the $FeO_2$ structural units can be in either the ferric or ferrous valence state, depending largely upon the source of the iron in the synthesis gel. Thus, a $FeO_2$ tetrahedron in the structure can have a net charge of either $-1$ or $-2$.<br>The patent indicates at column 5, lines 43-45 and 54-56, that crystalline amorphous aluminophosphate may be used as a source of phosphorus and aluminum and at column 6, lines 1-5, describes seeding of the reaction mixture as facilitating the crystallization procedure. |
| U.S. Application S.N. 600,173, filed April 13, 1984, EPC Publication 0 161 491, published Nov. 21, 1985 | The FeAPSO molecular sieves have a three-dimensional microporous crystal framework structures of $FeO_2^{-2}$ (and/or $FeO_2$), $AlO_2$, $PO_2$ and $SiO_2$ tetrahedral oxide units and having a unit empirical formula, on an anhydrous basis, of:<br>$mR:(Fe_wAl_xP_ySi_z)O_2$ (1)<br>wherein "R" represents at least one organic templating agent present in the intracrystalline pore system; "m" represents the moles of "R" present per mole of $(Fe_wAl_xP_ySi_z)O_2$ and has a value of from zero to about 0.3; the maximum value of "m" in each case depends upon the molecular dimensions of the templating agent and the available void volume of the pore system of the particular molecular sieve involved; and "w", "x", "y" and "z" represent the mole fractions of iron, aluminum, phosphorus and silicon, respectively, present as tetrahedral oxides.<br>The EP publication, at page 12, describes the use of seeding the reaction mixture to facilitate the crystallization procedure. At page 18, the publication describes the use of crystalline amorphous aluminophosphates as a source of phosphorus and aluminum in making the molecular sieve. |
| U.S. Ser. No. 600,170, EPC Publication 0 158 975, published Oct. 23,1985 | The ZnAPSO molecular sieves of U.S. Ser. No. 600,170, filed April 13, 1984 comprise framework structures of $ZnO_2^{-2}$, $AlO_2^-$, $PO_2^+$ and $SiO_2$ tetrahedral units havings an empirical chemical composition on an anhydrous basis expressed by the formula:<br>$mR:(Zn_wAl_xP_ySi_z)O_2$<br>wherein "R" represents at least one organic templating agent present in the intracrystalline pore system; "m" represents the molar amount of "R" present per mole of $(Zn_wAl_xP_ySi_z)O_2$ and has a value of zero to about 0.3; and "w", "x", "y" and "z" represent the mole fractions of zinc, aluminum, phosphorus and silicon, respectively, present as tetrahedral oxides and each has a value of at least 0.01.<br>This publication at page 13 discloses that crystalline or amorphous aluminophosphate may be used as a source of phosphorus or aluminum and at page 14 indicates that seeding of the reaction mixture with said crystals facilitates the crystallization procedure. Examples 12-15 are stated to employ the seeding procedure. |
| U.S. Application S.N. 600,180, filed April 13, 1984, EPC Publication 0 158 348, published Oct. 16, 1985 | The MgAPSO molecular sieves have three-dimensional microporous framework structures of $MgO_2^{-2}$, $AlO_2^-$, $PO_2^+$ and $SiO_2$ tetrahedral oxide units and have an empirical chemical composition on an anhydrous basis expressed by the formula:<br>$mR:(Mg_wAl_xP_ySi_z)O_2$<br>wherein "R" represents at least one organic templating agent present in the intracrystalline pore system; "m" represents the molar amount of "R" present per mole of $(Mg_wAl_xP_ySi_z)O_2$ and has a value from zero to about 0.3; and "w", "x", "y" and "z" represent the mole fractions of magnesium, aluminum, phosphorus and silicon, respectively, present as tetrahedral oxides and each preferably has a value of at least 0.01. This publication depicts seeding to generate product at page 14 and in examples 5, 6, 55, 58 and 59. |
| U.S. Application Ser. No. 600,175, filed April 4, 1984, EPC Publication 0 161 490, published Nov. 11, 1985 | The MnAPSO molecular sieves of U.S. Ser. No. 600,175, filed April 13, 1984 have a framework structure of $MnO_2^2$, $AlO_2$, $PO_2$, and $SiO_2$ tetrahedral units having an empirical chemical composition on an anhydrous basis expressed by the formula:<br>$mR:(Mn_wAl_xP_ySi_z)O_2$<br>wherein "R" represents at least one organic templating agent present in the intracrystalline pore system; "m" represents the molar amount of "R" present per mole of $(Mn_wAl_xP_ySi_z)O_2$ and has a value of zero to about 0.3; and "w", "x", "y" and "z" represent the mole fractions of element manganese, aluminum, phosphorus and silicon, respectively, present as tetrahedral oxides.<br>The publication at page 13 describes the use of crystal or amorphous aluminophosphate as a source of phosphorus or aluminum, and at page 14 characterizes the use of said crystals to facilitate the crystallization procedure. Example 54-56 and 59-62 state such crystals were used in the manufacture of the MnAPSO products. |
| U.S. Application Ser. No. 600,174, filed April 13,1984, EPC Publication 0 161 489, published Nov. 21, 1985 | The CoAPSO molecular sieves of U.S. Ser. No. 600,174, filed April 13, 1984 have three-dimensional microporous framework structures of $CoO_2^2$, $AlO_2$, $PO_2$ and $SiO_2$ tetrahedral units and have an empirical chemical composition on an anhydrous basis expressed by the formula:<br>$mR:(Co_wAl_xP_ySi_z)O_2$<br>wherein "R" represents at least one organic templating agent present in the intracrystalline pore system; "m" represents the molar amount of "R" present per mole of $(Co_wAl_xP_ySi_z)O_2$ and has a value of from zero to about 0.3; and "w", "x", "y" and "z" represents the mole fractions of cobalt, aluminum, phosphorus and silicon, respectively, present as tetrahedral oxides, where the mole fractions "w", "x", "y" and "z" are each at least 0.01.<br>The EP publication at page 13 depicts the use of crystalline amorphous aluminophosphate as a source of phosphorus and aluminum and at page 14 states that seeding the reaction mixture facilitates the crystallization procedure. Example 11, 12, 13, 93 and 97-103 depict the use of seed crystals. |
| U.S. Pat. No. Applic. 599,771, 599,776 599,807, 599,809, 599,811 | MeAPO molecular sieves are crystalline microporous aluminophosphates in which the substituent metal is one of a mixture of two or more divalent metals of the group magnesium, manganese, zinc and cobalt and are disclosed in U.S. Pat. No. 4,567,028. Members of this novel class of compositions have a three-dimensional microporous crystal framework structure of $MO_2^2$, $AlO_2$ and $PO_2$ tetrahedral units and have the essentially empirical chemical composition, on an anhydrous basis, of:<br>$mR:(M_xAl_yP_z)O_2$<br>wherein "R" represents at least one organic templating agent present in the intracrystalline pore system; "m" represents the |

TABLE A-continued

| Patent or Pat. Applic. No. | Subject Matter of Patent or Patent Application |
|---|---|
| 599,812<br>599,813<br>600,166<br>600,171<br>each filed<br>April 13, 1984,<br>EPC Publication<br>0 158 976,<br>published<br>Oct. 23,1985 | moles of "R" present per mole of $(M_xAl_yP_z)O_2$ and has a value of from zero to 0.3, the maximum value in each case depending upon the molecular dimensions of the templating agent and the available void volume of the pore system of the particular metal aluminophosphate involved; "x", "y" and "z" represent the mole fractions of the metal "M", (i.e., magnesium, manganese, zinc and cobalt), aluminum and phosphorus, respectively, present as tetrahedral oxides. When synthesized the minimum value of "m" in the formula above is 0.02.<br>The as-synthesized compositions are capable of withstanding 350° C. calcination in air for extended periods, i.e., at least 2 hours, without becoming amorphous.<br>The EP publication at pages 14 and 15 depicts the use of crystalline and amorphous aluminophosphate as a source of phosphorus and aluminum and at page 15 states that seeding the reaction mixture facilitates the crystallization procedure. Example 8 discloses seeding of crystals. |
| EPC Applic.<br>85104386.9,<br>filed<br>April 11,1985<br>(EPC<br>Publication No.<br>0158976,<br>published<br>Oct. 13, 1985)<br>and EPC Applic.<br>85104388.5,<br>filed<br>April 11, 1985<br>(EPC<br>Publication No.<br>158348,<br>published<br>October 16,<br>1985) | "ELAPO" molecular sieves are a class of crystalline molecular sieves in which at least one element capable of forming a three-dimensional microporous framework form crystal framework structures of $AlO_2$, $PO_2$ and $MO_2$ tetrahedral oxide units wherein "$MO_2$" represents at least one different element (other than Al or P) present as tetrahedral oxide units "$MO_2$" with charge "n" where "n" may be $-3$, $-2$, $-1$, 0 or $+1$. The members of this novel class of molecular sieve compositions have crystal framework structures of $AlO_2$, $PO_2$ and $MO_2$ tetrahedral units and have an empirical chemical compostion on an anhydrous basis expressed by the formula:<br>$mR:(M_xAl_yP_z)O_2$<br>wherein "R" represents at least one organic templating agent present in the intracrystalline pore system; "m" represents the molar amount of "R" present per mole of $(M_xAl_yP_z)O_2$; "M" represents at least one element capable of forming framework tetrahedral oxides; and "x", "y" and "z" represent the mole fractions of "M", aluminum and phosphorus, respectively, present as tetrahedral oxides. "M" is at least one different elements ($M_1$) such that the molecular sieves contain at least one framework tetrahedral units in addition to $AlO_2$ and $PO_2$. "M" is at least one element selected from the group consisting of arsenic, beryllium, boron, chromium, gallium, germanium and lithium, and when "M" denotes two elements the second element may be one of the aforementioned and/or is at least one element selected from the group consisting of cobalt, iron, magnesium, manganese, titanium and zinc.<br>The ELAPO molecular sieves are generally referred to herein by the acronym or "ELAPO" to designate element(s) "M" in a framework of $AlO_2$, $PO_2$ and $MO_2$ tetrahedral oxide units. Actual class members will be identified by replacing the "EL" of the acronym with the elements present as $MO_2$ tetrahedral units.<br>When "M" denotes two elements "M" may also be at least one element selected from the group consisting of cobalt, iron, magnesium, manganese, titanium and zinc. For example, in each instance "M" includes at least one of the first group of elements, e.g., As, Be, etc., and when two or more elements are present, the second and further elements may be selected from the first group of elements and/or the second group of elements, as above discussed.<br>The ELAPO molecular sieves have crystalline three-dimensional microporous framework structures of $AlO_2$, $PO_2$ and $MO_2$ tetrahedral units and have an empirical chemical composition on an anhydrous basis expressed by the formula:<br>$mR:(M_xAl_yP_z)O_2$;<br>wherein "R" represents at least one organic templating agent present in the intracrystalline pore system; "m" represents the molar amount of "R" present per mole of $(M_xAl_yP_z)O_2$ and has a value of zero to about 0.3; "m" represents at least one element capable of forming framework tetrahedral oxides where "M" is at least one element selected from the group consisting of arsenic, beryllium, boron, chromium, gallium, germanium and lithium. When "M" includes an additional element such additional elements "M" may be at least one element selected from the group consisting of cobalt, iron, magnesium, manganese, titanium, and zinc.<br>The relative amounts of element(s) "M", aluminum and phosphorus are expressed by the empirical chemical formula (anhydrous):<br>$mR:(M_xAl_yP_z)O_2$<br>where "x", "y" and "z" represent the mole fractions of said "M", aluminum and phosphorus. The individual mole fractions of each "M" (of when M denotes two or more elements, $M_1$, $M_2$, $M_3$, etc.) may be represented by "$x_1$", "$x_2$", "$x_3$", etc. wherein "$x_1$", "$x_2$", and "$x_3$", and etc. represent the individual mole fractions of elements $M_1$, $M_2$, $M_3$, and etc. for "M" as above defined. The values of "$x_1$", "$x_2$", "$x_3$", etc. are as defined for "x" hereinafter, where "$x_1$" + "$x_2$" + "$x_3$" ... = "x" and where $x_1$, $x_2$, $x_3$, etc. are each at least 0.01.<br>The ELAPO molecular sieves have crystalline three-dimensional microporous framework structures of $MO_2$, $AlO_2$ and $PO_2$ tetrahedral units having an empirical chemical composition on an anhydrous basis expressed by the formula:<br>$mR:(M_xAl_yP_z)O_2$<br>wherein "R" represents at least one organic templating agent present in the intracrystalline pore system; "m" represents a molar amount of "R" present per mole of $(M_xAl_yP_z)O_2$ and has a value of zero to about 0.3; "M" represents at least one different element (other than Al or P) capable of forming framework tetrahedral oxides, as hereinbefore defined, and "x", "y" and "z" represent the mole fractions of "M", aluminum and phosphorus, respectively, present as tetrahedral oxides. |
| U.S. Pat. No.<br>4,310,440 | $AlPO_4$'s are the basic and simplest of the crystalline aluminophosphate based molecular sieves. They each having a framework structure whose chemical composition expressed in terms of mole ratios of oxides is:<br>$Al_2O_5:1.0\pm0.2P_2O_3$.<br>each of said framework structures being microporous in which the pores are uniform and have nominal diameters within the range of about 3 to about 10A, an intracrystalline adsorption capacity for water at 4.6 torr and 24° C. of at least 3.5 weight percent, the adsorption and desorption of water being completely reversible while retaining the same essential framework topology in both the hydrated and dehydrated state. |
| U.S. Pat.<br>Applications<br>600,168,<br>600,181,<br>600,182,<br>600,183,<br>European Patent<br>Publ.<br>0 158 350,<br>published<br>Oct. 16, 1985 | SENAPSO are quinary and sernary molecular sieves that have framework structures of at least two elements having tetrahedral oxide units "$MO_2^m$" and having $AlO_2^-$, $PO_2^+$ $SiO_2$ tetrahedral oxide units, where "n" is $-3$, $-2$, $-1$, 0 or $+1$, and have an empirical chemical composition on an anhydrous basis expressed by the formula:<br>$mR:(M_wAl_xP_ySi_z)O_2$<br>wherein "R" represents at least one organic templating agent present in the incrystalline pore system; "m" represents the molar amount of "R" present per mole of $(M_wAl_xP_ySi_z)O_2$ and has a value of from 0 to about 0.3; "M" represents at least two elements selected from the group consisting of arsenic, beryllium, boron, chromium, cobalt, gallium, germanium, iron, lithium, magnesium, manganese, titanium, vanadium, and zinc; "n" is as above defined; and "w", "x", "y", and "z" represent the mole fractions of elements "M", aluminum, phosphorus and silicon, respectively, present as tetrahedral oxides, each having a value of at least 0,01.<br>The publication, at pages 14–15, generally describes seeding reaction mixtures to form the desired product. |

The various NZMSs depicted in the patents and patent applications of Table A are herein collectively termed QAPSO for the purpose of convenience in describing and claiming this invention. QAPSO are defined as a molecular sieve having an empirical chemical composition on an anhydrous basis expressed by the formula:

$$mR:(Q_wAl_xP_ySi_z)O_2 \qquad (I)$$

where "R" represents at least one element present as a framework oxide unit "$QO_2^n$" with charge "n" where "n" may be −3, −2, −1, 0 or +1; "R" represents at least one organic templating agent present on the intracrystalline pore system; "m" represents the molar amount of "R" present per mole of $(Q_wAl_xP_ySi_z)O_2$ and has a value from zero to about 0.3; and "w", "x", "y" and "z" represent the mole fractions of $QO_2^n$, $AlO_2^-$, $PO_2^+$, $SiO_2$, respectfully, present as framework oxide units. "Q" is characterized as an element having a mean "T-O" distance in tetrahedral oxide structures between about 1.51 Å and about 2.06 Å "Q" has a cation electronegativity between about 125 kcal/g-atom to about 310 kcal/gm-atom and "Q" is capable of forming stable Q-O-P, Q-O-Al or Q-O-Q bonds in crystalline three dimensional oxide structures having a "Q-O" bond dissociation energy greater than about 59 kcal/g-atom at 298° K.[4]; said mole fractions being within the limiting compositional values or points as follows:

w is equal to 0 to 98 mole percent;
y is equal to 1 to 99 mole percent;
x is equal to 1 to 99 mole percent; and
z is equal to 0 to 98 mole percent.

[4] See the discussion at pages 8a, 8b and 8c of EPC Application 0 159 624, supra, about the characterization of "EL" and "M". Such are equivalent to R as used herein.

The "Q" of the "QAPSO" molecular sieves of formula (I) may be defined as representing at least one element capable of forming a framework tetrahedral oxide and may be one of the elements arsenic, beryllium, boron, chromium, cobalt, gallium, germanium, iron, lithium, magnesium, manganese, titanium, vanadium and zinc.

The details on the preparation of SAPO-37 can be found in Examples 42, 43 and 44 of U.S. Pat. No. 4,440,871, supra. It is there shown on an anhydrous basis to be inclusive of the following formulas:

$$0.066(TPA):(Si_{0.12}Al_{0.51}P_{0.37})O_2$$

$$0.10(TPA+TMA):(Si_{0.125}Al_{0.51}P_{0.365})O_2$$

SAPO-37 has a characteristic X-ray powder diffraction pattern which contains at least the d-spacings as set forth in the table:

TABLE B

| 2 Theta | d | Relative Intensity |
|---|---|---|
| 6.1–6.3 | 14.49–14.03 | vs |
| 15.5–15.7 | 5.72–5.64 | w-m |
| 18.5–18.8 | 4.80–4.72 | w-m |
| 23.5–23.7 | 3.79–3.75 | w-m |
| 26.9–27.1 | 3.31–3.29 | w-m |

The NZMS-37s, such as SAPO-37 molecular sieves, are classed large pore aluminophosphates. The pores have a nominal diameter of greater than about 6.2 Angstroms, see col. 51, lines 37–39 of U.S. Pat. No. 4,440,871, and the pore sizes of the large pore species are nominally 0.8 nm. The framework topology of the NZMS-37s such as SAPO-37 conform to the faujasite structure. For example, the "essentially empirical composition" of SAPO-37 is $mR:(Si_xAl_yP_z)O_2$, where R represents at least one organic templating agent as, for example, indicated in the Examples 42–44 of U.S. Pat. No. 4,440,871[5], present in the intracrystalline pore system; m has a typical value of from 0 to 0.3 and represents the moles of R present per mole of $(Si_xAl_yP_z)O_2$; x, y and z represent the mole fractions of silicon, aluminum and phosphorus, respectively, present as tetrahedral oxides. The fractions are such that they are within a pentagonal compositional area defined by points A, B, C, D and E of the ternary diagram of FIG. 1 and preferably within the pentagonal compositional area defined by points a, b, c, d and e of FIG. 2 of the drawings of the patent. Further, the as-synthesized crystalline SAPO-37 may be calcined at a temperature sufficiently high to remove at least some of any organic templating agent present in the intracrystalline pore system as a result of such synthesis.

[5] Specifically mentioned are tetra-n-propylammonium hydroxide and a mixture of tetra-n-propylammonium hydroxide and tetramethylammonium hydroxide pentahydrate. The ions of each are regarded to be the templating agent.

Because NZMS-37s are of the faujasite structural family, they can be combined with any of the other members of this family to make the catalytic multiphase composites of this invention. The faujasitic NZMSs, i.e., other than SAPO-37, and their manufacture are taught in the applicable patents and patent applications of Table A and their disclosures in that regard are specifically incorporated herein by reference.

Illustrative zeolite members of the faujasite structural family are the natural or synthetic varieties such as faujasite and the many versions of zeolites X and Y. Illustrative of zeolites having the faujasite structure are the following: AgX, AgY, AlHY, alkylammonium X and Y, BaX, BaY, BeY, Ca-germanic near-faujasite, Ca-HX, Ca-X, Ca-Y, calcium $NH_4Y$, CdX, CdY, CeY, CoX, CoY, CrY, CsX, CsY, Cu-X, Cu-Y, diethylammonium Y, ethylammonium Y, Fe-X, Fe-Y, HY, KX, KY, L, La-X, La-Y, LiA, LiX, LiY, LZ-10, LZ-210, $MgNH_4Y$, MgHY, MgNaY, MgNaX, $MgNH_4Y$, MgX, MgY, MnX, MnY, Na-germanic near faujasite, Na-X, Na-Y, $NH_4$-germanic near faujasite, $NH_4X$, $NH_4Y$, activated $NH_4Y$, Ni-X, Ni-Y, PdY, rare earth X, rare earth Y, rare earth ammonium Y, RbX, RhY, SrX, SrY, steam stabilized or ultra-stable Y, tetramethylammonium Y, triethylammonium Y, X, Y, Zn-X, Zn-Y, and the like. Any of these may serve as the deposition substrate or the outer layer deposit (subject to the cautions herein about pH effects on a NZMS deposition substrate). Since many of the faujasite types are produced in large volumes, such as the zeolites of the X and Y families, and they are the least costly of the components used in the manufacture of the composites of this invention, as pointed out above, they represent a preferred deposition substrate.

The catalytic composites of this invention are made by the hydrothermal crystallization of reactive gel precursors to the crystal structure in the presence of a deposition substrate (support surface) for crystal growth thereon. The gel precursors depend upon the composition being made. In the case of an aluminosilicate based crystal framework, the precursors are the typical aluminumate and silicate compositions employed for making such aluminosilicates. Indeed, a characteristic of this invention is that each phase may be made by conventional procedures in the art for making the composition of the particular phase. It is typically not necessary to employ a new process for generating a phase in the presence of another phase in order to enjoy the fruits of this invention.

The class of non-zeolitic aluminum and phosphorus based molecular sieves are typically synthesized by hydrothermal crystallization of reactive aluminum and phosphorus containing gels containing optionally the additional framework elements and an organic template, at temperatures from about 50° C. (122° F.) to about 250° C. (482° F.), preferably from about 100° C. (212° F.) to about 225° C. (437° F.). The optimum crystallization temperature depends on composition and structure. The AlPO₄ and SAPO materials tend not to crystallize at temperatures below about 125° C. (257° F.), whereas several of the MeAPO species crystallize readily at about 100° C. (212° F.).

QAPSO compositions are generally synthesized by hydrothermal crystallization from a reaction mixture containing active sources of element(s) "Q" (optional), silicon (optional), aluminum and phosphorus, preferably an organic templating, i.e., structure-directing, agent which is preferably a compound of an element of Group VA of the Periodic Table, and optionally, an alkali or other metal. The reaction mixture is generally placed in a sealed pressure vessel, preferably lined with an inert plastic material such as polytetrafluoroethylene and heated, preferably under autogenous pressure at an effective temperature which is preferably between about 100° C. (212° F.) and about 225° C. (437° F.), more preferably between 100° C. (212° C.) and 200° C. (424° F.), until crystals of the specific variety of QAPSO product are obtained, usually an effective crystallization time of from several hours to several weeks. Generally, effective crystallization times of from about 2 hours to about 30 days are employed with typically from 4 hours to about 20 days being employed to obtain the QAPSO product version. The product is recovered by any convenient method such as centrifugation or filtration.

In synthesizing the operative QAPSO compositions of the instant invention, it is preferred to employ a reaction mixture composition expressed in terms of molar ratios as follows:

$$aR:(Q_wAl_xP_ySi_z)O_2:bH_2O$$

wherein "R" is an organic templating agent: "a" is the amount of organic templating agent "R" and has a value of from zero to about 6 and is preferably an effective amount within the range of greater than zero (0) to about 6; "b" has a value of from zero (0) to about 500, preferably between about 2 and about 300; "Q" represents at least one element, as herein before described, capable of forming a framework oxide unit, $TO_2{}^n$, with $SiO_2$, $AlO_2{}^-$ and $PO_2{}^+$ tetrahedral oxide units; "n" has a value of $-3$, $-2$, $-1$, $0$ or $+1$; and "w", "x", "y", "z" are as defined above.

In the foregoing expression of the reaction composition, the reactants are normalized with respect to the total of "w", "x", "y", and "z" such that $w+x+y+z=1.00$ mole, whereas in the examples in the reaction mixtures may be expressed in terms of molar oxide ratios normalized to the moles of $P_2O_5$. This latter form is readily converted to the former form by routine calculations by dividing the number of moles of each component (including the template and water) by the total number of moles of elements "Q", aluminum, phosphorus and silicon which results in normalized mole fractions based on total moles of the aforementioned components.

In forming reaction mixtures from which the operative QAPSO molecular sieves are formed an organic templating agent is preferably employed and may be any of those heretofore proposed for use in the synthesis of conventional zeolite aluminosilicates. In general these compounds contain elements of Group VA of the Periodic Table of Elements, particularly nitrogen, phosphorus, arsenic and antimony, preferably nitrogen or phosphorous and most preferably nitrogen, which compounds also contain at least one alkyl or aryl group having from 1 to 8 carbon atoms. Particularly preferred compounds for use as templating agents are the amines, quaternary phosphonium and quaternary ammonium compounds, the latter two being represented generally by the formula $R'_4X^+$ wherein "X" is nitrogen or phosphorous and each R' is an alkyl or aryl group containing from 1 to 8 carbon atoms. Polymeric quaternary ammonium salts such as $[(C_{14}H_{32}N_2)(OH)_2]_x$ wherein "x" has a value of at least 2 are also suitably employed. The mono-, di- and tri-amines are advantageously utilized, either alone or in combination with a quaternary ammonium compound or other templating compound. Mixtures of two or more templating agents may either produce mixtures of the desired QAPSOs or the more strongly directing templating species may control the course of the reaction with the other templating species serving primarily to establish the pH conditions of the reaction gel. The initial gel pH in most cases is weakly acidic facilitating the successful incorporation of the hydrolyzable metal cation form of the elements into the frameworks, and inhibiting their precipitation as spurious hydroxides or oxides. Representative templating agents include: ammonium ions such as tetramethylammonium, tetraethylammonium, tetrapropylammonium, tetrabutylammonium, and tetrapentylammonium and amines such as di-n-propylamine, tripropylamine, triethylamine, triethanolamine, piperidine, cyclohexylamine, 2-methylpyridine, N,N-dimethylbenzylamine, N,N-dimethylethanolamine, choline, N,N'-dimethypiperazine, 1,4-diazabicyclo(2,2,2,)octane, N-methyldiethanolamine, N-methylethanolamine, N-methylpiperidine, 3-methylpiperidine, N-methylcyclohexylamine, 3-methylpyridine, 4-methylpyridine, quinuclidine, N,N'-dimethyl-1,4-diazabicyclo(2,2,2)octane, di-n-butylamine, neopentylamine, di-n-pentylamine, isopropylamine, t-butylamine, ethylenediamine, diethylenetriamine, triethylenetetraamine, pyrrolidine, 2-imidazolidone, and the like. Not every templating agent will direct the formation of every species of QAPSO, i.e., a single templating agent may, with proper manipulation of the reaction conditions, direct the formation of several QAPSO compositions, and a given QAPSO composition can be produced using several different templating agents.

The organic template appears to play a critical structure-directing role. The template is trapped or clathrated in the structural voids as the crystals grow. Over eighty-five amines and quaternary ammonium species demonstrate utility as crystallization templates, including primary, secondary, tertiary and cyclic amines, and alkanolamines. In many cases, structure control is exercised by other synthesis variables such as temperature, template concentration, gel oxide composition, and pH. The influence of the template is both steric and electronic.

The source of silicon may be silica, either as a silica sol or as fumed silica, a reactive solid amorphous precipitated silica, silica gel, alkoxides of silicon, silica containing clays silicic acid or alkali metal silicate and mixtures thereof.

The most suitable phosphorus source yet found for the present process is phosphoric acid, but organic phosphates such as triethyl phosphate have been found satisfactory, and so also have crystalline or amorphous aluminophosphates such as the AlPO4 compositions of U.S. Pat. No. 4,310,440. Organo-phosphorus compounds, such as tetrabutylphosphonium bromide do not, apparently, serve as reactive sources of phosphorus, but these compounds do function as templating agents. Conventional phosphorus salts such as sodium metaphosphate, may be used, at least in part, as the phosphorus source, but are not preferred.

The preferred aluminum is either an aluminum alkoxide, such as aluminum isoproproxide, or pseudoboehmite. The crystalline or amorphous aluminophosphates which are a suitable source of phosphorus are, of course, also suitable sources of aluminum. Other sources of aluminum used in zeolite synthesis, such as gibbsite, aluminum-containing clays, sodium aluminate and aluminum trichloride, can be employed but are not preferred.

The element(s) "Q" can be introduced into the reaction system in any form which permits the formation in situ of a reactive form of the element, i.e., reactive to form a framework oxide unit of element "Q". Compounds of element(s) "Q" which may be employed include oxides, hydroxides, alkoxides, nitrates, sulfates, halides, carboxylates and mixtures thereof. Representative compounds which may be employed include: carboxylates of arsenic and beryllium; cobalt chloride hexahydrate, alpha cobaltous iodide; cobaltous sulfate; cobalt acetate; cobaltous bromide, cobaltous chloride; boron alkoxides; chromium acetate; gallium alkoxides; zinc acetate; zinc bromide; zinc formate; zinc iodide; zinc sulfate heptahydrate; germanium dioxide; iron (II) acetate; lithium acetate; magnesium acetate; magnesium bromide; magnesium chloride; magnesium iodide; magnesium nitrate; magnesium sulfate; manganese acetate; manganese bromide; manganese sulfate; titanium tetrachloride; titanium carboxylates; titanium acetate; zinc acetate; and the like.

While not essential to the synthesis of QAPSO compositions, stirring or other moderate agitation of the reaction mixture and/or seeding the reaction mixture with seed crystals of either the QAPSO species to be produced or a topologically similar aluminophosphate, aluminosilicate or other molecular sieve composition, facilitates the crystallization procedure. It should be appreciated that in the case of seeding, the amount of the seed should not make up a significant proportion of the eventual molecular sieve composition. Usually, the seed would not be more than about 10 weight percent of the weight of the resultant molecular sieve. However, if the seed represents a phase of the composite, then its function is different and that of a deposition substrate, and thus a larger amount is required, as herein specified.

After crystallization the QAPSO product may be isolated and advantageously washed with water and dried in air. The as-synthesized QAPSO generally contains within its internal pore system at least one form of any templating agent employed in its formation. Most commonly this organic moiety, derived from any organic template, is present, at least in part, as a charge-balancing cation as is generally the case with as-synthesized aluminosilicate zeolites prepared from organic-containing reaction systems. It is possible, however, that some or all of the organic moiety may be an occluded molecular species in a particular QAPSO species. As a general rule the templating agent, and hence the occluded organic species, is too large to move freely through the pore system of the QAPSO product and must be removed by calcining the QAPSO at temperatures of 200° C. to 700° C. to thermally degrade the organic species. In some instances the pores of the QAPSO compositions are sufficiently large to permit transport of the templating agent, particularly if the latter is a small molecule, and accordingly complete or partial removal thereof may be accomplished by conventional desorption procedures such as carried out in the case of zeolites. It will be understood that the term "as-synthesized" as used herein does not include the condition of QAPSO species wherein any organic moiety occupying the intracrystalline pore system as a result of the hydrothermal crystallization process has been reduced by post-synthesis treatment such that the value of "m" in the composition formula:

$$mR:(Q_wAl_xP_ySi_z)O_2$$

has a value of less than 0.02. The other symbols of the formula are as defined hereinabove. In those preparations in which an alkoxide is employed as the source of element(s) "Q", aluminum, phosphorous and/or silicon, the corresponding alcohol is necessarily present in the reaction mixture since it is a hydrolysis product of the alkoxide. It has not been determined whether this alcohol participates in the syntheses process as a templating agent. For the purposes of this application, however, this alcohol is arbitrarily omitted from the class of templating agents, even if it is present in the as-synthesized QAPSO material.

Since the present QAPSO compositions are formed from $AlO_2^-$, $PO_2^+$, $SiO_2$ and $QO_2^n$ framework oxide units which, respectively, has a net charge of $-1$, $+1$, 0 and "n", where "n" is $-3$, $-2$, $-1$, 0 or $+1$, the matter of cation exchangeability is considerably more complicated than in the case of zeolitic molecular sieves in which, ideally, there is a stoichiometric relationship between $AlO_2^-$ tetrahedra and charge-balancing cations. In the instant compositions, an $AlO_2^-$ tetrahedron can be balanced electrically either by association with a $PO_2^+$ tetrahedron or an extra framework cation such as an alkali metal cation, a cation of the element "Q" present in the reaction mixture, or an organic cation derived from the templating agent. Similarly, an $QO_2^n$ oxide can be balanced electrically by association with $PO_2^+$ tetrahedra, an extra framework cation such as an alkali metal cation, a cation of the metal "Q", organic cations derived from the templating agent, or other divalent or polyvalent metal cations introduced from an extraneous source.

The QAPSO compositions may exhibit cation-exchange capacity when analyzed using ion-exchange techniques heretofore employed with zeolite aluminosilicates and have pore diameters which are inherent in the lattice structure of each species and which are at least about 3 Å in diameter. Ion exchange of QAPSO compositions will ordinarily be possible only after the organic moiety present as a result of synthesis has been removed from the pore system. Dehydration to remove water present in the as-synthesized QAPSO compositions can usually be accomplished, to some degree at least, in the usual manner without removal of the organic moiety, but the absence of the organic species greatly facilitates adsorption and desorption procedures.

In the examples, a stainless steel reaction vessel is utilized which is lined with an inert plastic material, polytetrafluorethylene, to avoid contamination of the reaction mixture. In general, the final reaction mixture, from which the composite is crystallized, is prepared by forming mixtures of all of the reagents before adding the deposition substrate, then adding the deposition substrate. Conversely, the deposition substrate may be first added to a reactor and then the reagents for forming the hydrogel which generates the outer layer may be added. Hydrothermal crystallization thereafter follows. There are conditions where the reagents of a phase result in hydrothermal crystallization kinetics which are different from those produce by the reagents of another phase. In that situation, the reagents can be combined at the same time and the difference in kinetics provides a deposition substrate for crystal growth. Such is termed "differential crystallization" herein. In some instances the admixed reagents retain their identity in the intermediate mixture and in other cases some or all of the reagents are involved in chemical reactions to produce new reagents. The term "mixture" is applied in both cases. Further, unless otherwise specified, each intermediate mixture as well as the final reaction mixture was stirred until substantially uniform.

X-ray patterns of reaction products are obtained by X-ray analysis using standard x-ray powder diffraction techniques. The radiation source is a high-intensity, copper target, X-ray tube operated at 50 Kv and 40 ma. The diffraction pattern from the copper K-alpha radiation and graphite monochromator is suitably recorded by an X-ray spectrometer scintillation counter, pulse height analyzer and strip chart recorder. Flat compressed powder samples are scanned at 2° (2$\theta$) per minute, using a two second time constant. Interplanar spacings (d) in Angstrom units are obtained from the position of the diffraction peaks expressed as 2$\theta$ where $\theta$ is the Bragg angle as observed on the strip chart. Intensities are determined from the heights of diffraction peaks after substracting background, "I." being the intensity of the strongest line or peak, and "I" being the intensity of each of the other peaks.

Alternatively, the X-ray patterns are obtained from the copper K-alpha radiation by use of computer based techniques using Siemens D-500 X-ray powder diffractonmeters, Siemens Type K-805 X-ray sources, available from Siemens Corporation, Cherry Hill, New Jersey, with appropriate computer interface.

As will be understood by those skilled in the art the determination of the parameter 2 theta is subject to both human and mechanical error, which in combination, can impose an uncertainty of about ±0.4° (denotes plus or minus 0.4°) on each reported value of 2 theta. This uncertainty is, of course, also manifested in the reported values of the d-spacings, which are calculated from the 2 theta values. This imprecision is general throughout the art and is not sufficient to preclude the differentiation of the present crystalline materials from each other. In some of the X-ray patterns reported, the relative intensities of the d-spacings are indicated by the notations vs, s, m, w and vw which represent very strong, strong, medium, weak and very weak, respectively.

In certain instances the purity of a synthesized product may be assessed with reference to its X-ray powder diffraction pattern. Thus, for example, if a sample is stated to be pure, it is intended only that the X-ray pattern of the sample is free of lines attributable to crystalline impurities, not that there are no amorphous materials present.

Zeolite compositions, used to make the composites of this invention, may be made free of contact with the QAPSO containing phase or in the presence of the QAPSO containing phase. They may be generated by the hydrothermal crystallization of aluminate and silicate under basic conditions. Aqueous gels of the reactants are heated at temperatures ranging from about 50° C. (122° F.) to about 300° C. (572° F.), preferably from about 100° C. (212° F.) to about 250° C. (482° F.). The optimum crystallization temperature depends on composition and structure. A good characterization of processes for the manufacture of zeolites can be found at Chapter Four of Breck, supra, and at Chapter 11 of Rabo, supra.

The composites of this invention are conveniently formed by the hydrothermal crystallization of one phase in the presence of the other or another. Broadly speaking, each phase of the composite is derived by the hydrothermal crystallization of the components thereof from an aqueous gel. The composite derives from the hydrothermal crystallization of the precursor to the formation of an intended phase in the presence of a deposition substrate which constitutes another phase of the composite. The deposition substrate need not be, in the practice of this invention, a fully formed (e.g., not fully crystallized) composition. Thus, one might initiate the production of a molecular sieve structure by the hydrothermal crystallization procedure, and prior to the fully formed crystal structure, such is utilized as a deposition substrate by the addition thereto of the precursors to be used for the manufacture of an outer layer. In such a case, the deposition substrate is termed to be in the "green" state. There will be instances where one will remove a cation or cations from the deposition substrate after depositing an outer layer thereon. Such cation removal can be effected after the deposition has been completed and a composite structure is formed.

A differential crystallization of one phase prior to another using a single gel that generates both phases is another method of forming a deposition substrate. Such a procedure works effectively when both phases are NZMSs and primarily differ by the presence or absence of Me or EL elements which generate MeAPO, MeAPSO, ELAPO or ELAPSO compositions.

The invention does not depend upon the existence of a clear demarcation between one phase and another either during the manufacture of the composite or in the finished composite. As pointed out above, there is often a transformation occurring at the interface of the phases such that the interface could constitute a nominal third phase of an intended two-phase system or fourth or fifth phase of an intended three-phase system. Indeed, one may look at the transition from one phase to another as a gradient compositional change existing between the phases though it is believed that the gradient is primarily differentiable at about the interface with the remainder of the phases being each more homogeneous compositionally. The compositional heterogeneity of the composites of this invention extends in a gross sense by virtue of a difference in the composition of the phases and in the relationship of a phase to the other in respect to the composition at the interface.

The hydrocrystallization conditions for synthesizing the composite is that cited above with respect to the specific molecular sieve composition intended for the phase undergoing hydrothermal crystallization. When a preformed zeolitic molecular sieve is used as a deposition substrate for the intended deposition of a non-zeolitic aluminum and phosphorus based molecular sieve then, of course, the hydrothermal crystallization of reactive aluminum and phosphorus gels in the presence of the zeolitic molecular sieve should be employed. This does not mean that the synthesis will yield a phase which mimics entirely the composition of molecular sieve which is intended by that hydrothermal crystallization synthesis. The compositions that are formed are believed to be different in subtle ways by what transpires at the interface, as indicated above, but similar enough so as to be embraced by the prior characterization of the composition of such a molecular sieve. Preferably, one of the phases, acting as a deposition substrate, is a fully formed crystalline structure. The template may or may not be essentially removed before the composition is subjected to contact with the components which are used to generate the other phase. The deposition substrate is a support for the next produced phase (outer layer) and provides the basis for epitaxial growth. Once one phase is crystallized in the presence of another crystal phase, the composite may be used as the support for the creation of still another solid phase. This procedure may be repeated as many times as desired or as there exists enough molecular sieves of different compositions but having the same crystalline framework to provide a composite of an essentially single crystal structure. By this technique, one may produce a composite having repeated layers of different molecular sieves in an onion skin pattern, except that in the case of the composites of this invention, the skins are chemically bonded to one another. There are occasions where one might wish to blend the ingredients of distinct molecular sieve compositions and effect the hydrothermal differential crystallization to form a mixed phase composition encompassed by this invention. In the typical case, the composites will be formed by the hydrothermal crystallization of a molecular sieve brew in contact with another but already formed or partially formed crystalline molecular sieve of appropriate crystalline structure.

It is believed that the composite is formed by the epitaxial growth of a crystal onto the surface of the deposition substrate. [It may be the case in some instances that this growth is facilitated by the deposition substrate. Such may be termed a "seeding" effect. However, that would be an insignificant consideration in comparison to the role of the deposition substrate in forming composites having unique and unexpected properties.] The growth in this manner yields a substrate support surface onto which a layer of crystalline molecular sieve is deposited and epitaxially grafts in the process of the hydrothermal crystallization to the crystal framework of the support surface. In this fashion, one may obtain a core surrounded or enveloped by a layer or a film or a mantle of the other molecular sieve(s). Membranes having a differential of exchange properties across the depth of the composite can be made from multi-layers of these films deposited over the core and onto each previously deposited layer. Composites which are multi-faceted in their performance can be made up of layers each of which has a different adsorption and catalytic characteristic.

There is the possibility that during hydrothermal crystallization of a phase in the presence of another already formed phase that some of the crystallization will result in particles free of composite formation, that is, the crystallization does not occur on the surface of the formed phase. Experience to date shows that little if any independent crystallization of that type occurs. In the usual case, not more than about 50 weight percent of the generated product of the hydrothermal crystallization will comprise such particles free of composite formation. More preferably, not more than about 25 weight percent, most preferably not more than about 5 weight percent, and most desirably (and usually) about 0 weight percent, of the generated product of the hydrothermal crystallization will comprise such particles free of composite formation.

The shape of the composite is particulate but when used as a FCC catalyst, such use will determine its overall configuration. In the context of FCC catalysis, the composite may be used as formed or they may be combined either by a binderless process or by use of other ingredients and formed into a structure more desirable for the use. The particles can be formed into another shape by a variety of techniques well known in the art, such as by spray drying, combining the particles via a matrix binder, and the like. Catalysts will be made to properly configure to the shape of the reactor or the reaction mode. However, certain special effects can be obtained with the composite structures of this invention. For example, rather than deposit the outer layer onto the deposition surface prior to associating the composite with a matrix bonding media, the deposition substrate can first be shaped by spray drying or by combination with a matrix bonding media according to the use (viz., into pellets, extrudates, and the like) and then the shaped body containing the deposition substrate or surface is subjected to the hydrothermal crystallization in a brew of the precursors forming the outer layer. The outer layer is thus deposited on the deposition surface that remains exposed in the shaped body. This procedure minimizes the amount of outer layer required for a composite/matrix shaped product. In the preferred embodiment, the composite is formed prior to the formation of a shaped body containing the composite.

A special advantage of the composite structures of this invention resides in the fact that the depth of the layer of a given phase of the composite provides a mechanism for controlling the performance characteristics of that phase as a catalyst. If the phase is extremely active owing to a too high level of acidity, one may retain a high level of catalytic activity while minimizing the destructive features (e.g. secondary reactions) of the high acidity. It is known that the destructive aspects of an acidic and hence active catalyst is dependent upon the residence time a reactant spends in the catalyst. By depositing a small layer of the active phase onto a deposition surface which is relatively inert to the reactant (vis-a-vis the outer layer), the contact time of the reactant with the catalyst, in particular the outer layer of the catalyst, is minimized to the extent that the destructive feature of the catalyst is minimized. It is axiomatic that a useful catalyst which has a propensity to destroy primary reaction products and generate unwanted by-products, does so at a rate lower than the desired catalyzed reaction, otherwise the catalyst would yield little in benefits. By reducing the thickness of the active catalyst layer, the tortuous diffusion contact time will also be reduced in the active catalyst. This should improve the selectivity of the catalyst to produce the desired reaction products and minimize secondary reaction products. The layered composite catalysts of this invention provide such a benefit by controlling the depth of the outer layer, and hence the tortuous diffusion, to accomodate the activity of the outer layer to the desired reaction and reaction products.

Thus, a factor in the design of a composite catalyst made according to this invention is the consideration of the various reactions which may be affected by the catalyst. If the reaction simply involves a conversion of

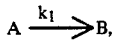

then little criticality with respect to selectivity over the amount and size of the outer layer is seen. However, if the reaction generates irreversible by-products ("C") as in the case of

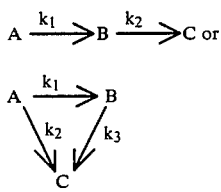

where the secondary reactions $k_2$ and $k_3$ generate undesired by-products C, then it is preferred that the contact within the catalyst be sufficiently limited to the depth of the outer, more active layer such that the predominant reaction is $k_1$ and reactions $k_2$ and/or $k_3$ are minimized, if not avoided. In this way, the catalytic impact is more selective in the case of these layered catalysts than in the full catalyst particle where the outer layer composition is the whole of the particle composition.

This is illustrated in the data on FCC performance of a non-composited SAPO-37 FCC catalyst. Though both the non-composited SAPO-37 FCC catalyst and composited SAPO-37 FCC catalyst exhibit essentially the same exterior to the oil feed and possess the same kind of porosity, the non-composited SAPO-37 generates more unwanted by-products than the composited SAPO-37. Compositing, as characterized herein, provides a basis for minimizing unwanted by-product formation.

This aspect of the benefits of the invention can be appreciated by recognizing that microporous molecular sieves have pores which extend throughout the crystal structure. Most of the catalyst's surface area is found in these pores. It is the pore surface area which provides essentially all of the catalyst's active sites. As the feedstock enters the interior of the catalyst, it progresses a labyrinthian or tortuous course, as such or as reaction products generated in the catalyst. Tortuous diffusion dictates that given enough contact time, some of the primary reaction products will react with active sites on the catalyst's pore surface and such generally results in the formation of lower molecular weight products. By reducing the size of the labyrinthian course provided by the most active catalyst species the problems associated with tortuous diffusion are reduced. As a result, the selectivity to product is enhanced because the level of contact time within the most active portion of the catalyst is controlled sufficiently to minimize the generation of secondary reaction(s).

The shape of the finished catalyst may be in the form of particles formed in the manufacture of the composite or the formed particles can be bonded to each other directly or indirectly through a binding medium to make a larger shaped catalyst in satisfaction of the intended catalyst use. In the most common case, composite particles will be bound together by a variety of techniques such as by spray drying, pelletizing, extrusion, and the like. An inert binder is typically used to shape the composite particles into predetermined pellets, spray-dried particles or extrudates, as one desires, using conventional techniques of the catalyst art. For example, composite particles may be blended with a matrix material, typically one that would be inert to the reactants of the catalytic process, and spray dried, pelletized or extruded into the desired shape. It is not necessary to provide or use another FCC catalyst with the catalyst of the invention in the FCC process. Needless to say, one may opt to combine the catalyst of this invention with another catalyst for a special effect and still be embraced by this invention. The configuration of the composite of the invention is not critical to this invention, but can be important in respect to a particular FCC use.

The composites of this invention are superior FCC catalysts in almost all respects to the phases which make up the composite. This synergy in performance allows one to trade on the advantages afforded by a component phase thereof. Usually, a component phase will possess a property which is superior to that same property of the other component phase(s). That dominant property will, in most instances, also prevail as the dominant property characteristic of the composite. In many cases, the composites property in question will be even more favorable that the property exhibited by the molecular sieve structure having the dominant property, especially when compared on a weight for weight basis. However, one can expect that there will be instances when this synergy will not prevail, though it is the expectation that the synergistic situation will be the dominant case.

FCC catalysts made from the composite particles which contain binder are typically a physical blend of the tiny composite particles with an inorganic oxide matrix component which may be any of the inorganic oxide matrix components which have been employed heretofore in the formulation of catalysts including: amorphous catalytic inorganic oxides, e.g., catalytically active silica-aluminas, clays, silicas, aluminas, silica-aluminas, silica-zirconias, silica-magnesias, alumina-aluminas, alumina-titanias and the like and mixtures thereof. The composite is usually mixed with the matrix component and then formed in the appropriate catalyst shape.

The inorganic oxide matrix components, e.g. aluminas, silicas, clays, etc., may be present in the final catalyst in an amount ranging between about 5 and about 99 weight percent, preferably between about 5 and about 95 weight percent and more preferably between about 10 and about 85 weight percent, based on the total catalyst weight.

The inorganic oxide matrix component may be in the form of a sol, hydrogel or gel and is typically an alumina, silica, clay and/or silica-alumina component such as employed in a conventional silica-alumina catalyst, several types and compositions of which are commercially available. The matrix component may itself provide a catalytic effect or it may be essentially inert. The matrix may act as a "binder" in some instances, although in some instances the final or finished catalyst may be spray dried or formed without the need of a binder. These materials may be prepared as a cogel of silica and alumina or as alumina precipitated on a preformed and preaged hydrogel. The silica may be present as a component in the solids present in such gels, e.g., present in an amount between about 5 and about 40 weight percent and preferably between about 10 and about 30 weight percent. Silica may also be employed in the form of a cogel comprising about 75 weight percent silica and about 25 weight percent alumina or comprising about 87 weight percent silica and about 13 weight percent alumina.

The alumina component may comprise discrete particles of various aluminas, e.g., pseudobeohmite. The alumina component may be in the form of discrete particles having a total surface area, as measured by the method of Brunauer, Emmett and Teller (BET), greater than about 20 square meters per gram ($m^2/g$), preferably greater than 145 $m^2/g$, for example, from about 145 to about 300 $m^2/g$. The pore volume of the alumina component is typically greater than 0.35 cc/g. The average particle size of the alumina particles is generally less than 10 microns and preferably less than 3 microns. The alumina may be employed alone as the matrix or composited with the other matrix components such as the silica, as mentioned previously. The alumina component may be any alumina and, preferably, has been preformed and placed in a physical form such that its surface area and pore structure are stabilized. This means that when the alumina is added to an impure, inorganic gel containing considerable amounts of residual soluble salts, the salts will not alter the surface and pore characteristics measurably nor will they promote chemical attack on the preformed porous alumina which could undergo change. For example, the alumina may be an alumina which has been formed by suitable chemical reaction, slurry aged, filtered, dried, washed free of residual salt and then heated to reduce its volatile content to less than about 15 weight percent. Further, an alumina hydrosol or hydrogel or hydrous alumina slurry may be used in catalyst preparation.

Mixtures of the composite particles and the inorganic matrix may be formed into the final form for the catalyst by standard catalyst forming techniques including spray-drying, pelleting, extrusion and other suitably conventional means. It is most common to make FCC catalysts by spray drying, the procedures for which are well known to those skilled in the art of preparing catalysts.

Illustrative of the procedures for making catalysts from the composites of this invention is the following: Sodium silicate is reacted with a solution of aluminum sulfate to form a silica/alumina hydrogel slurry which is then aged to give the desired pore properties, filtered to remove a considerable amount of the extraneous and undesired sodium and sulfate ions and then reslurried in water. The alumina may be prepared by reacting solutions of sodium aluminate and aluminum sulfate under suitable conditions, aging the slurry to give the desired pore properties of the alumina, filtering drying, reslurry in water to remove sodium and sulfate ions and drying to reduce volatile matter content to less than 15 weight percent. The alumina may then be slurried in water and blended in proper amounts, with a slurry of impure silica-alumina hydrogel. The composite molecular sieve may then be added to this blend. A sufficient amount of each component is utilized to give the desired final composition. The resulting mixture is then filtered to remove a portion of the remaining extraneous soluble salts therefrom. The filtered mixture is then dried to produce dried solids. The dried solids are subsequently reslurried in water and washed substantially free of the undesired soluble salts. The catalyst is then dried to a residual water content of less than about 15 weight percent. The catalyst is typically recovered after calcination.

It is also within the scope of the instant invention to employ other materials in addition to the composite and inorganic oxide matrix components in the final catalysts, including various other types of zeolites, clays, carbon monoxide oxidation promoters, etc.

Representative of matrix systems employable herein are disclosed in British Patent Specification No. 1,315,553, published May 2, 1973 and U.S. Pat. Nos. 3,446,727 and 4,086,187, such being incorporated herein by reference thereto.

The conditions for effecting the cracking reaction are those described in the art for cracking a petroleum fraction to generate a lower boiling material. The temperatures range from about 350° C. (662° F.) to about 700° C. (−1300° F.), with the temperatures specified earlier representing the typical temperature conditions. The pressure of the cracking reaction may range from subatmospheric to superatmospheric pressures. The cracking reaction may be operated batchwise or in a continuous mode, the latter, of course, being favored. The catalytic cracking process can be either fixed bed, moving bed or fluidized bed and the hydrocarbon charge stock may be either concurrent or countercurrent to the conventional catalyst flow.

The hydrocarbon or petroleum stocks undergoing cracking in accordance with is invention comprise hydrocarbons generally and, in particular, petroleum fractions having an initial boiling point at atmospheric pressure of at least 200° C. (−390° F.), a 50% point of at least 260° C. (500° F.) at atmospheric pressure and an end point at atmospheric pressure of at least 300° C. (−570° F.). Such hydrocarbon fractions include gas oils, residual oils, cycle stocks, whole top crudes and heavy hydrocarbon fractions derived by the destructive hydrogenation of coal, shale oil, tar, pitches, asphalts, and the like. It is to be appreciated that the distillation of higher boiling petroleum fractions above about 400° C. (−750° F.) at atmospheric pressure should be carried out under vacuum in order to avoid thermal cracking.

In order to more particularly illustrate this invention, specific reference will be made to embodiments thereof. It is not intended that such should act to limit the scope of the invention.

As an illustration of a variety of catalytic composites embraced by this invention, the following Table C illustrates, by constructive reduction, two-phase composites utilizing the techniques described herein of depositing one molecular sieve as an outer layer on to a deposition substrate of another molecular sieve by the hydrothermal crystallization process.

The composites in Table C use the designated molecular sieve deposition substrates and outer layers. Each deposition substrate is preformed using the procedures disclosed in the referenced prior art. The outer layers are made according to the following general procedure, to be modified in accordance with the referrenced prior art. The general procedure is as follows:

The gel is prepared by dissolving in a first container the indicated amount of the templating agent cited in the referenced prior art. This is followed by the addition of the indicated amount of the silica source, if used, and if not used, the aluminum and phosphorus sources, in accordance with the referenced prior art. If a silica is used, then in a second container, the indicated amount cited by the referenced prior art of a hydrated aluminum oxide (such as a pseudo-boehmite phase, 74.2 wt. % $Al_2O_3$ 25.8 wt. % $H_2O$), the indicated amount of the phosphorus source, such as phosphoric acid (85%), the indicated amount of the metal salt, and a specified amount of water, are thoroughly mixed. In the next step, the mixture in the first container is added to the alumina, phosphoric acid and metal salt (if employed) slurry in the second container and the combination is mixed for an additional period of time to form a gel that would be used to treat the deposition substrate. If only one container is employed, then the contents are appropriately mixed until the gel consistency is achieved.

In forming the composite, a thorough mixture of the gel and the deposition substrate are placed in a 250 cc polytetrafluoroethylene-lined, stainless steel reactor and digested quiescently (without operation of the stirrer) for about 5 to 24 hours at 200° C. The composite product of the digestion is cooled, and the supernatant liquid present is decanted. The solid product is washed several times in water and finally air dried.

The weight ratios cited in Table C is of the deposition substrate phase to the outer layer. Each composite has utility as an FCC catalyst.

TABLE C

| Outer Layer | Deposition Substrate | Weight Ratios[6] |
|---|---|---|
| SAPO-37 | Y-82 | 1 |
| " | $NH_4Y$ | 1 |
| " | Activated $NH_4Y$ | 1 |
| MnAPSO-37[7] | $CaNH_4Y$ | 1 |
| " | $MgNH_4Y$ | 1 |
| " | Rare Earth $NH_4Y$ | 1 |
| BeAPO-37 | X | 2 |
| " | LZ-10 | 1.22 |
| ZAPSO-37[8] | Y-82 | 1 |
| " | X | 1 |
| " | LZ-210 | |
| SAPO-37 | acid washed LZ-210 | 3 |
| SAPO-37 | CoAPSO-37 | .75 |
| CoAPSO-37[9] | SAPO-37 | 8 |
| " | MAPSO-37 | 3 |
| " | MnAPSO-37 | 1 |
| " | ZnAPSO-37 | .9 |
| TiAPSO-37 | AsAPO-37 | 1 |
| " | BeAPO-37 | 2 |
| " | BAPO-37 | 2 |
| SAPO-37 | CrAPSO-37 | 1.5 |
| " | GaAPO-37 | 1.5 |
| " | LiAPO-37 | 2 |
| LiAPO-37 | VAPO-37 | 3 |
| CoAPSO-37 | AsAPSO-37 | 1 |
| " | BeAPSO-37 | 2 |
| " | BAPSO-37 | 2 |
| " | CrAPSO-37 | 1.5 |
| " | GaAPSO-37 | 1.5 |
| GaAPSO-37 | LiAPSO-37 | 2 |
| " | VAPSO-37 | 3 |

[6]Weight ratio of deposition substrate to outer layer, ie, deposition substrate / outer layer
[7]See example 107 of copending application S.N. (Attorney's docket no. D-15,444).
[8]See Example 108 of copending application S.N. (Attorney's docket no. D-15,444).
[9]See Example 106 of copending application S.N. (Attorney's docket no. D-15,444).

In addition to the foregoing detailed characterization of this invention, the following enumerated examples serve to further define this invention.

EXAMPLE 1

The composite in this example uses a Y molecular sieve as the deposition substrate and SAPO-37 as the outer layer. The Y molecular sieve used as a deposition substrate was prepared from a commercial lot of Y-62 (sold by Union Carbide Corporation) molecular sieve which was treated as follows:

(a) ammonium exchanged several times to lower its $Na_2O$ content from 2.24% to 0.32%;

(b) the resulting ammonium exchanged Y-62 was further exchanged with tetramethylammonium chloride (TMACl) as follows: 60.0 grams TMACl were dissolved in 600 cc of water to yield a solution with a pH of 4.9; to this solution was added sufficient tetramethylammonium hydroxide pentahydrate ($TMAOH.5H_2O$) to raise the pH to 7.2. Then 60.0 grams of the ammonium exchanged Y-62 (anhydrous basis) were added to the above solution and the slurry was stirred at room temperature for 45 minutes. The treated zeolite was collected, washed and then subjected to two more $TMAOH.5H_2O$ exchanges using fresh solution. The final $TMAOH.5H_2O$ exchanged Y was designated TMAY.

A SAPO-37 gel was prepared as follows: 5.5 grams of $TMAOH.5H_2O$ was dissolved in 508.5 grams of tetra-n-propylammonium hydroxide (TPAOH) solution (40% in water) in container number 1. Next 19.05 grams of fumed silica (Cab-O-Sil EH5) (94.5 wt. % $SiO_2$, 5.5 wt. % $H_2O$) were slurried in the above solution and stirred for about 20 minutes. Sixty-eight (68) grams of hydrated aluminum oxide (a pseudo-boehmite phase, 74.2 wt. % $Al_2O_3$, 25.8 wt. % $H_2O$), 115.3 grams of phosphoric acid (85%) and 84 grams of water were thoroughly mixed in container number 2. Then, the solution in container number 1 was added to the alumina and phosphoric acid slurry in container number 2 and the combination was mixed for an additional 30 minutes to form the SAPO-37 gel that would be used to treat the modified Y-62 (TMAY).

About 14 grams of TMAY were thoroughly mixed with 200 grams of the SAPO-37 gel described above and the mixture was placed in a 250 cc polytetrafluoroethylene-lined, stainless steel bomb and digested quiescently for about two hours at 200° C. The product of this digestion was cooled, and the supernatant liquid was decanted. The solid product was washed several times in water and finally air dried.

EXAMPLES 2 and 3

These examples demonstrate that the SAPO-37 gel used in Example 1 could be used repeatedly to make two or more batches of composite of this invention.

The fresh gel prepared as in Example 1 was slurried with fresh TMAY, digested and formed into a composite. Specifically, TMAY was reacted with the gel as described in Example 1, except that the reaction was allowed to proceed at 200° C. for 5 hours. The reaction mixture was cooled, the supernatant was decanted and the composite of the first treatment was collected and washed (composite of Example 2). Then 165 grams of this supernatant were mixed with 11.6 grams of fresh TMAY and the mixture was digested quiescently at 200° C. for 20 hours. The reaction mixture was cooled, the solids were collected and washed several times with water and the composite of the second treatment was collected and washed (composite of Example 3). Examples 2 and 3 are further characterized in Table D which follows in terms of certain process conditions, concentrations of products recovered and relative X-ray powder diffraction pattern:

TABLE D

| Example No. | DIGESTION TIME (HRS) | DIGESTION TEMP. °C. | DEPOS. SUBST. | WTG(Gr.)[1] | GEL WTG(Gr.)[2] | PRODUCT WTG(Gr)[1] | % XRD[3] CRYSTALLINITY |
|---|---|---|---|---|---|---|---|
| 2 | 5 | 200 | TMAY | 14 | 200 | 16.9 | 102.8 |
| 3 | 20 | 200 | TMAY | 11.6 | 165 | 15.0 | 107.4 |

FOOTNOTES TO TABLE:
[1]DEPOSITION SUBSTRATE ("DEPOS. SUBST.") AND PRODUCT WEIGHTS ARE GIVEN ON AN ANHYDROUS BASIS
[2]GEL COMPOSITION (SEE DESCRIPTION IN EXAMPLE 1 ABOVE) FOR ALL PREPARATIONS WAS HELD CONSTANT:
TPOAH(40%) 63.5%
TMAOH.5H$_2$O 0.69%
Al$_2$O$_3$ 8.5%
FUMED SILICA 2.4%
H$_3$PO$_4$(85%) 14.4%
WATER 10.4%
GIVEN AS WEIGHT PERCENTS ON TOTAL GEL WEIGHT
[3]X-RAY DIFFRACTION CRYSTALLINITY RELATIVE TO STARTING DEPOSITION SUBSTRATE CRYSTALLINITY

EXAMPLES 4–12

Examples 4–12 were carried out by following the procedure of Example 1 with the exception of the variation in the deposition substrate composition, reagent concentrations and process conditions noted in the Table E which follows:

TABLE E

| Example No. | DIGESTION TIME (HRS) | DIGESTION TEMP. °C. | DEP. SUBST. | WTG(Gr.)[2] | GEL WTG(Gr.)[2] | PRODUCT WTG(Gr)[1] | % XRD[3] CRYSTALLINITY |
|---|---|---|---|---|---|---|---|
| 4 | 24 | 200 | TMAY | 14 | 200 | 25.6 | 104.1 |
| 5 | 2 | 200 | TMAY | 13.8 | 197.5 | 18.1 | 69.8 |
| 6 | 4 | 200 | TMAY | 13.8 | 197.5 | 15 | 82.0 |
| 7 | 6 | 200 | TMAY | 13.8 | 197.5 | 21.4 | 103.2 |
| 8 | 24 | 200 | TMAY | 13.8 | 197.5 | 28.3 | 100.5 |
| 9 | 6 | 200 | Y-62 | 14 | 200 | 20.7 | 107.4 |
| 10[4] | 5 | 200 | LSY-62[5] | 28 | 400 | 39.0 | 88.2 |
| 11 | 8 DAYS | 80 | TMAY | 6 | 80 | 8.0 | 53.7 |
| 12 | 8 DAYS | 80 | Y-62 | 6 | 80 | 10.4 | 41.9 |

FOOTNOTES TO TABLE:
[1]DEPOSITION SUBSTRATE AND PRODUCT WEIGHTS ARE GIVEN ON AN ANHYDROUS BASIS
[2]GEL COMPOSITION (SEE DESCRIPTION IN EXAMPLE 1 ABOVE FOR ALL PREPS WAS HELD CONSTANT:
TPAOH(40%) 63.5%
THAOH.5H$_2$O 0.69%
Al$_2$O$_3$ 8.5%
FUMED SILICA 2.4%
H$_3$PO$_4$(85%) 14.4%
WATER 10.4%
GIVEN AS WEIGHT PERCENTS ON TOTAL GEL WEIGHT
[3]X-RAY POWDER DIFFRACTION CRYSTALLINITY RELATIVE TO STARTING DEPOSITION SUBSTARTE CRYSTALLINITY
[4]SUBSEQUENTLY STEAMED AT 600° C. FOR 1 HR AT 100% H$_2$O (HUMIDITY)
[5]LOW SODIUM Y-62

The following chemical analyses Table F sets forth the chemical analyses and some crystallographic data of the composites and deposition substrate compositions of Examples 1–12 above:

TABLE F

| Example No. | DIGEST. TIME(HR) | DEP. SUBS. | % C | % N$_2$[1] | % (NH$_4$)$_2$O | % Al$_2$O$_3$ | % P$_2$O$_5$ | % SiO$_2$ | UNIT CELL SIZE[3] | % XRD CRYSTAL.[2] |
|---|---|---|---|---|---|---|---|---|---|---|
| 1 | 2 | TMAY | 5.45 | 4.12 | 5.69 | 0.41 | 28.93 | 6.42 | 48.91 | 24.791 | 81.6 |
| 2 | 5 | TMAY | 7.93 | 3.85 | 4.67 | 0.29 | 28.00 | 14.35 | 40.37 | 24.764 | 102.8 |
| 4 | 24 | TMAY | 9.59 | 3.54 | 4.11 | 0.22 | 28.31 | 19.06 | 35.50 | 24.772 | 104.1 |
| 3 | 20 | TMAY | 9.51 | 4.12 | 5.27 | 0.21 | 24.40 | 12.49 | 44.33 | 24.805 | 107.4 |
| 5 | 2 | TMAY | 3.48 | 3.35 | 5.47 | 0.25 | 31.80 | 8.94 | 47.33 | 24.756 | 69.8 |
| 6 | 4 | TMAY | 7.89 | 3.65 | 5.06 | 0.24 | 26.97 | 12.49 | 43.23 | 24.747 | 82.0 |
| 7 | 6 | TMAY | 8.98 | 3.27 | 4.67 | 0.23 | 27.42 | 14.82 | 40.26 | 24.752 | 103.2 |
| 8 | 24 | TMAY | 11.33 | 3.17 | 3.85 | 0.23 | 27.86 | 18.69 | 35.33 | 24.745 | 100.5 |
| 9 | 6 | Y-62 | 8.70 | 3.17 | 4.47 | 1.53 | 28.44 | 14.57 | 39.60 | 24.738 | 107.4 |
| 10 | 5 | LSY62 | 10.73 | 3.76 | 4.87 | 0.11 | 26.44 | 15.82 | 38.83 | 24.768 | 88.2 |
| 11 | 8 DAYS | TMAY | 4.79 | 3.07 | 3.80 | 0.49 | 35.21 | 20.12 | 32.39 | 24.756 | 53.7 |
| 12 | 8 DAYS | Y-62 | 7.57 | 2.60 | 3.43 | 1.06 | 34.04 | 23.64 | 26.83 | 24.754 | 41.9 |
| DEPOSITION SUBSTRATE COMPOSITIONS | | | | | | | | | | | |
| 1–8 & 11 | TMAY | | 3.49 | 5.17 | 8.06 | 0.32 | 21.42 | | 61.25 | 24.860 | 100 |
| 9 & 12 | Y-62 | | | | 9.70 | 2.24 | 22.40 | | 66.20 | 24.760 | 100 |
| 10 | LOW SODA Y-62 | | | | 10.70 | 0.36 | 22.00 | | 65.90 | 24.750 | 100 |

FOOTNOTES TO TABLE:
[1]% N = NON-AMONIUM NITROGEN ANALYSIS.
[2]X-RAY POWDER DIFFRACTION CRYSTALLINITY RELATIVE TO STARTING DEPOSITION SUBSTARTE CRYSTALLINITY. X-ray powder diffraction PEAK AREA = SUM OF FIVE MAJOR WATER INSENSITIVE PEAKS, OBTAINED ON UNCALCINED MATERIAL.
[3]UNIT CELL SIZE WAS DETERMINED ON UNCALCINED MATERIALS.

Tables D, E and F summarize the details of the SAPO-37 containing composites synthesis of Examples 1–12, relevant deposition substrate compositions and part of their analyses. Information is provided on the deposition substrate and gel weights used in the synthesis as well as on the amount and x-ray crystallinity of the product obtained as a function of time. The relative amount of gel, 200 grams, in Examples 1-10, and deposition substrate, about 14 grams, see Examples 1 and 3-9, were chosen based on previous experience with SAPO-37 syntheses in which a deposition substrate was not employed. At the specified ratio the expected maximum yield of SAPO-37 phase is equal to the weight of deposition substrate employed. Therefore, if the anticipated SAPO-37 phase growth were to occur, the product would contain approximately 50% deposition substrate and 50% SAPO-37 phase. Examination of the data for these examples as provided in the tables reveals that after only two hours the weight of solid product (Example 1) was unchanged from the amount of deposition substrate initially used indicating that little growth had occurred. The product obtained is only 81.6% as crystalline as the starting deposition substrate indicating either some deposition substrate decomposition or the deposition of an amorphous phase. The product obtained after 5 hour digestion (Example 3) did show some evidence of growth with a 2.9 gram weight gain over the initial deposition substrate weight and according to x-ray analysis was completely crystalline with a small amount of SAPO-5 impurity. Based on peak areas relative to pure SAPO-5, the 5 hour sample contained about 10% of this impurity; the rest of the sample had the typical X-ray powder diffraction patterns of Y zeolite and SAPO-37. The yield of the 24 hour digestion product (Example 4) suggested considerable growth of a solid phase gaining over 11 grams relative to the deposition substrate. This product was also completely crystalline and also contained a small amount of SAPO-5 impurity.

The presence of SAPO-5 in small quantities in the 5 hour product (Example 2) and in the 24 hour product (Example 4) is considered atypical of these SAPO-37 containing composites syntheses since all subsequent preparations (Examples 5-12) were free of this impurity.

The above chemical analyses table shows, in the case of the two hour preparation (Example 1), the presence of about 6.42% phosporus and an increase in alumina content from 21.42% for the deposition substrate to 28.9% in the digested product. The silica content had decreased from 61.3 to 48.9%. Upon longer digestion times the product phosphorus content increased still further to 14.4% at five hours (Example 2) and to 19.1% at 24 hours (Example 4). At the five and 24 hour digestion times the alumina content remained constant at about 28% but the silica content dropped still further to 40.4% and 35.5% respectively.

The results of analytical investigation of the SAPO-37 containing composite products of Examples 1,2 and 4 can be summarized as follows. After two hour digestion of the low soda TMA exchanged Y-62 deposition substrate in SAPO-37 gel, there is no apparent evidence of the growth of a SAPO-37 phase. X-ray suggests that some crystal degradation has occurred and infrared framework spectra show no evidence that the phosphorus present is incorporated into the crystal structure of the zeolite.

After five hours of digestion, some growth is evidenced by a small weight gain relative to the starting deposition substrate weight. At this length of digestion, the deposition substrate had become completely crystalline again. Obviously, some SAPO-37 growth had occurred at the exterior of each Y deposition substrate crystal because the materials X-ray powder diffraction showed only the Y and SAPO-37 patterns exclusive of the small amount of SAPO-5 impurity.

After 24 hours of digestion, significant growth of crystalline material has occurred with the product nearly doubling its weight relative to the starting deposition substrate. This clearly demonstrates that the thickness of the outer layer or mantle can be varied by digestion time with the 24 hour digestion time product being thicker than, e.g., the 5 hour digestion time product.

CATALYST PREPARATIONS

The composite molecular sieves described above in Examples 1-12, and in Tables D-F associated with those examples, were formulated into FCC catalysts in order to evaluate their catalytic properties in the micro activity test (MAT). In general all catalysts were prepared in very similar fashion, which involved binding a mixture of molecular sieve and inert matrix, kaolin clay, with silica binder. The bound mixture was extruded, typically to form 1/16" extrudates, then dried, ground and sieved to obtain meshed particles of catalyst in the range of 60 to 100 mesh size. Unless otherwise noted hereinafter, all catalysts were prepared to contain 18% molecular sieve, 62% kaolin matrix and 20% silica binder on an anhydrous basis. In the case of SAPO-37 and SAPO-37/Y zeolite composites (of the present invention) containing catalysts it was found extremely important to prepare all catalysts using the uncalcined forms of these molecule sieves. In their uncalcined form SAPO-37 and SAPO-37/Y composites are stable in water and can survive the catalyst formulation procedure which involves the use of water to form the extrudate. However, in their calcined form the presence of water at ambient temperatures may result in molecular sieve decomposition. Having formed the extruded, dried and meshed SAPO containing catalyst, the template is removed in subsequent steaming steps described below little or no damage to the SAPO framework.

The procedures involved in FCC catalyst preparation are illustrated in the following example:

EXAMPLE 13

The catalyst base was prepared to contain 62 wt. % kaolin matrix, 20 wt. % silica binder and 18 wt. % of the SAPO-37 containing composite of Example 1 above. To achieve this, 9.0 grams (anhydrous basis) of the SAPO-37/TMAY composite were blended in uncalcined form with 31.0 grams of kaolin clay. Ten grams Ludox LS (a 40.0% $SiO_2$ sol sold by DuPont) were gelled by addition of a small amount of 10% aqueous ammonium acetate solution, and the gelled silica sol was then blended into the clay/SAPO mixture. To this was added about 25 cc of water to form an extrudable paste which was extruded to form ⅛" extrudates. The extrudates were dried at 100° C. and then crushed and sized to obtain catalyst particles ranging in size from 60 to 100 mesh (U.S.). This sized portion of catalyst was then divided into four equal portions, which were then destructively steamed at varying temperatures prior to MAT testing to simulate the hydrothermal environment experienced in commercial FCC regenerators and in the case of SAPO containing catalysts to remove the template which to this point has been left intact.

Further details about this catalyst preparation are set forth in the footnotes to Table G which follows. Other catalysts as noted in Table G were prepared according to the above procedure but modified by the procedures referred to in the table.

all catalysts described were subjected to customary steaming prior to MAT evaluation.

In general, this steam treatment involved treating the meshed catalysts in a fixed horizontal bed at the desired temperatures in 100% steam for about two hours followed by cooling in dry air; however, three minor variations on steam treatment procedure were employed. The variations were related to the pretreatment given each catalyst just prior to customary steaming. The three variations employed were:

1. Pre-calcination in air at 500° C. for one hour followed by ramping to the desired steam temperature.
2. Ramping from 400° C. in steam to the desired steaming temperature.
3. Plunge firing the catalyst into the furnace at the desired steaming temperature with no pretreatment These variations in steaming procedure appeared to have little effect on the SAPO-37 composite catalyst's performance in MAT evaluation. It seems that no special care is needed in the use of these template containing catalysts as long as the catalysts are not exposed to moisture at ambient temperatures once the template has been removed. In commercial FCC use, the templates may be removed as the SAPO containing catalyst is added to the regenerator section of the FCC unit. Catalysts compositions, pretreatment and steaming conditions for all of the catalysts described are summarized in preceeding Table H. In order to further illustrate typical methods employed in catalyst steaming, the specific

TABLE G

| MOLECULAR SIEVE EXAMPLE NO. | CATALYST[1] EXAMPLE NO. | PRE-TREAT[2] MODE | STEAM DEACTIVATION TIME | TEMP, °C. | COMMENTS |
|---|---|---|---|---|---|
| 1 | 1A | B | 2 | 760 | SAPO-37 COMPOSITE |
| " | 1B | B | 2 | 785 | " |
| " | 1C | B | 2 | 810 | " |
| " | 1D | B | 2 | 840 | " |
| 2 | 2A | B | 2 | 760 | " |
| " | 2B | B | 2 | 785 | " |
| " | 2C | B | 2 | 810 | " |
| " | 2D | B | 2 | 840 | " |
| 4 | 4A | B | 2 | 760 | " |
| " | 4B | B | 2 | 785 | " |
| " | 4C | B | 2 | 810 | " |
| " | 4D | B | 2 | 840 | " |
| 3 | 3A | A | 2 | 760 | " |
| 6 | 6A | A | 2 | 760 | " |
| 7 | 7A | A | 2 | 760 | " |
| 8 | 8A | A | 2 | 760 | " |
| 5 | 5A | B | 2 | 760 | SAPO-37 COMPOSITE FROM REUSED GEL |
| " | 5B | B | 2 | 785 | " |
| " | 5C | B | 2 | 810 | " |
| " | 5D | B | 2 | 840 | " |
| 9 | 9A | A | 2 | 760 | SAPO-37 COMPOSITE FROM Y-62 deposition substrate |
| " | 9B | A | 2 | 790 | " |
| 10 | 10A | D | 2 | 760 | SAPO-37 COMPOSITE STEAM STABILIZED BEFORE EVALUATION |
| " | 10B | D | 2 | 790 | SAPO-37 COMPOSITE STEAM STABILIZED BEFORE EVALUATION |
| " | 10C | D | 2 | 810 | SAPO-37 COMPOSITE STEAM STABILIZED BEFORE EVALUATION |
| " | 10D | D | 2 | 840 | SAPO-37 COMPOSITE STEAM STABILIZED BEFORE EVALUATION |
| 11 | 11A | A | 2 | 760 | LOW TEMPERATURE TREATMENT |
| " | 11B | A | 2 | 790 | LOW TEMPERATURE TREATMENT |
| 12 | 12A | A | 2 | 760 | LOW TEMPERATURE TREATMENT |
| " | 12B | A | 2 | 790 | LOW TEMPERATURE TREATMENT |

FOOTNOTES:
[1]ALL CATALYSTS WERE PREPARED TO CONTAIN: 18% MOLECULAR SIEVE 62% KAOLIN CLAY 20% SILICA BINDER
[2]PRE-TREATMENT CODES:
A PRECALCINATION IN AIR AT 500° C. FOR ONE HOUR FOLLOWED BY RAMPING TO THE DESIRED DESTRUCTIVE TEMPERATURE IN STEAM
B RAMPING FROM 400° C. IN STEAM TO THE DESIRED DESTRUCTIVE STEAMING TEMPERATURE.
C PLUNGE FIRING THE CATALYST INTO THE FURNACE AT THE DESIRED DESTRUCTIVE STEAMING TEMPERATURE WITH NO TREATMENT
D STEAM STABILIZED AT 600° C., FOR 1 HOUR IN 100% H$_2$O, PRIOR TO DESTRUCTIVE STEAMING AT THE LISTED TEMPERATURE.

Catalyst Pre-Steaming Procedure

FCC catalysts spend over 90% of their lifetime in the regenerator section of an FCC unit in which they are subjected to high temperature hydrothermal conditions. Thus, the regenerator which removes coke deposits from the catalyst also causes aging, and, specifically, degradation in a zeolite's crystallinity. This degradation is accompanied by a loss in framework aluminum content as evidenced by a significant drop in the unit cell size of commercially aged catalysts. Both the loss in crystallinity and the loss of framework aluminum cause a significant cracking activity loss. Since real catalysts go through a plurality of cycles of cracking and regeneration before they are ultimately replaced by fresh catalyst the actual activity of the catalyst in inventory in this cyclic system is significantly reduced from that of the fresh catalyst. It is the performance of this deactivated, equilibrium catalyst mixture that is of most interest to the refiner since it determines the quality of products that the refiner can make. In order to simulate the FCC regenerator environment and to better estimate the performance of experimental catalysts in FCC use, procedure used for steaming catalyst examples 1A-D, 2A-D and 3A-D is given in the next paragraph.

Sized catalysts particles prepared as described above, were placed in porcelain boats. About 12 to 15 grams of catalyst were steamed at a time. These boats were then plunged into a horizontal tube furnace which was equilibrated with flowing steam at 400° C. Next the furnace was ramped to the desired destructive steam temperature which ranged from 760° to 840° C. Catalysts were held at temperature for 2 hours at which time the steam atmosphere was replaced with flowing air and the furnace and catalysts were cooled to 300° C. While at 300° C. catalysts were removed from the furnace, bottled hot and submitted for MAT evaluation. The catalysts were cooled in dry air to avoid degradation caused by water at ambient conditions.

Mat Evaluation

All catalysts were evaluated for performance in FCC applications by the micro-activity test procedure defined by the ASTM method D-3907. All catalysts were evaluated at 900° F., at a catalyst to oil ratio of 3.0 and at a weight hourly space velocity (WHSV) of about 16. The feed used in this evaluation was a vacuum gas oil with the following properties:

| API gravity (60/60) | 24 |
|---|---|
| Total N, ppm | 700 |
| Basic N, ppm | 300 |
| UOP K Factor | 11.8 |
| Simulated Distillation (ASTM D-2887) | |
| IBP, F | 354 |
| 50%, F | 745 |
| FBP, F | 1077 |

All runs were carried out in reactors whose configurations were equivalent to that described in ASTM D-3907. All products were collected and analyzed. Product analysis was used to calculate conversion and product selectivities and yields as defined below:

$$\% \text{ Conversion} = \frac{(\text{weight of feed} - \text{weight of 430} + \text{F liquid product})}{(\text{weight of feed})} \times 100$$

$$\% \text{ Gasoline Selectivity} = \frac{(\text{weight \% Gasoline Yield})}{(\% \text{ Conversion})} \times 100$$

where:

$$\text{Gasoline Yield} = \frac{(\text{Weight } C_{5+} \text{ to } 430° \text{ F. products})}{(\text{weight of feed delivered})} \times 100$$

$$\% \text{ Gas Yield} = \frac{(\text{weight of } C_1 + C_2 + C_3 \text{ products})}{(\text{weight of feed delivered})} \times 100$$

$$\% \text{ Coke Yield} = \frac{(\text{weight coke on catalyst}) \times (\text{catalyst weight})}{(\text{weight of feed delivered})} \times 100$$

Liquid products were analyzed by capillary gas chromatographic method to determine the paraffinic, olefinic, naphthenic and aromatic content of the gasoline range products.

The results of MAT evaluation of all catalysts, including the prior art catalysts of Table H, are summarized in Tables J to M, where % conversions and selectivities and yields to all products of interest are tabulated.

In order to compare the performance of the composite FCC catalysts of this invention, a series of catalysts were made from either SAPO-37 or from the various Y zeolites that were employed in Examples 1-12 to make up the composites. Their preparations including steam treatments are depicted in Table H with their analyses set forth in Table I. Tables J through M set forth the MAT performances for the SAPO-37 composite catalysts of this invention and provide comparative data with respect to the MAT performances of the catalysts made from Y and SAPO-37 molecular sieves.

TABLE H

| EXAMPLE NO. | MOLECULAR SIEVE DESCRIPTION[1] | CATALYST NO.[2] | PRETREAT MODE[3] | STEAM DEACTIVATION TIME (HR.) | STEAM DEACTIVATION TEMP °C. |
|---|---|---|---|---|---|
| 14 | SAPO-37, QUIESCENT | 14A | C | 3 | 760 |
| 15 | " | 15A | C | 2 | 840 |
| 16 | " | 16A | C | 3 | 760 |
| 17 | " | 17A | C | 3 | 788 |
| 18 | " | 18A | C | 2 | 810 |
| 19 | " | 19A | C | 2 | 840 |
| 20 | SAPO-37, STIRRED | 20A | C | 3 | 760 |
| 21 | " | 21A | C | 3 | 760 |
| 22 | " | 22A | C | 3 | 760 |
| 23 | " | 23A | C | 3 | 760 |
| 24 | " | 24A | C | 3 | 760 |
| 25 | SAPO-37, STIRRED | 25A | A | 2 | 760 |
| 26 | " | 26A | A | 2 | 760 |
| 27 | " | 27A | A | 2 | 785 |
| 28 | " | 28A | A | 2 | 760 |
| 29 | " | 29A | A | 2 | 790 |
| 30 | " | 30A | A | 2 | 810 |
| 31 | " | 31A | A | 2 | 830 |
| 32 | CREY, COMMERCIAL | 32A | A | 2 | 760 |
| 33 | " | 33A | A | 2 | 790 |
| 34 | " | 34A | A | 2 | 810 |
| 35 | " | 35A | A | 2 | 830 |
| 36 | Y-82, COMMERCIAL | 36A | C | 2 | 840 |
| 37 | " | 37A | C | 2 | 810 |
| 38 | " | 38A | C | 3 | 785 |
| 39 | "31 | 39A | C | 3 | 760 |
| 40 | LZ-10, COMMERCIAL | 40A | COMMERCIAL PRODUCT | | |

TABLE H-continued

| EXAMPLE NO. | MOLECULAR SIEVE DESCRIPTION[1] | CATALYST NO.[2] | PRETREAT MODE[3] | STEAM DEACTIVATION TIME (HR.) | STEAM DEACTIVATION TEMP °C. |
|---|---|---|---|---|---|
| | | | ALREADY STEAMED | | |

FOOTNOTES:
[1] "QUIESCENT" AND "STIRRED" INDICATE WHETHER STIRRING WAS USED DURING HYDROTHERMAL CRYSTALLIZATION OF THE MOLECULAR SIEVE IN QUESTION. EXAMPLES 14–15, 16–19, 20–24, 25, 26 ARE SEPARATE BATCH PREPARATIONS.
[2] ALL CATALYSTS WERE PREPARED TO CONTAIN: 18% MOLECULAR SIEVE 62% KAOLIN CLAY 20% SILICA BINDER
[3] PRE-TREATMENT CODES:
A PRECALCINATION IN AIR AT 500° C. FOR ONE HOUR FOLLOWED BY RAMPING TO THE DESIRED DESTRUCTIVE TEMPERATURE IN STEAM
B RAMPING FROM 400° C. IN STEAM TO THE DESIRED DESTRUCTIVE STEAMING TEMPERATURE.
C PLUNGE FIRING THE CATALYST INTO THE FURNACE AT THE DESIRED DESTRUCTIVE STEAMING TEMPERATURE WITH NO PRETREATMENT

TABLE I

| EXAMPLE NO. | % C | % N[1] | % $(NH_4)_2O$ | % $Na_2O$ | % $RE_2O_3$ | % $Al_2O_3$ | % $P_2O_5$ | % $SiO_2$ | % LOI[2] | $Si/Al_2$ | $Al/P$ |
|---|---|---|---|---|---|---|---|---|---|---|---|
| 14 | 13.2 | 1.80 | | | | 33.7 | 32.1 | 11.7 | 22.2 | 0.59 | 1.46 |
| 16 | 14.1 | 2.00 | | | | 30.1 | 33.4 | 11.0 | 24.5 | 0.62 | 1.25 |
| 20 | 14.4 | 1.90 | | | | 29.7 | 34.4 | 12.4 | 22.0 | 0.71 | 1.20 |
| 25 | 0.03 | 0.03 | | | | 31.3 | 29.6 | 12.1 | 28.0 | 0.66 | 1.47 |
| 26 | 0.05 | 0.05 | | | | 32.2 | 28.9 | 11.9 | 25.7 | 0.63 | 1.56 |
| 32 | | | | 0.77 | 15.4 | 19.3 | | 62.9 | | 5.54 | |
| 37 | | | 4.02 | 0.17 | | 21.6 | | 72.8 | | 5.73 | |
| 40 | | | −0.30 | 0.07 | | 16.4 | | 66.9 | 16.0 | 6.93 | |

FOOTNOTES:
[1] NON-AMMONIA NITROGEN CONTENT ASSOCIATED WITH ORGANIC TEMPLATE
[2] LOI = LOSS ON IGNITION

TABLE J

MAT PERFORMANCE FOR SAPO-37

| EXAMPLE NO. | CATALYST NO. | STEAM, °C.[1] | WT. % MAT CONVERSION | % GASOLINE SELECTIVITY[2] | WT. % GAS YIELD | WT. % COKE YIELD |
|---|---|---|---|---|---|---|
| 41 | 14A | 760 | 77.32 | 63.00 | 7.74 | 8.75 |
| 42 | 15A | 840 | 48.37 | 75.13 | 3.63 | 2.65 |
| 43 | 14A | 760 | 77.89 | 62.91 | 7.95 | 8.55 |
| 44 | 15A | 840 | 53.61 | 75.59 | 3.93 | 2.70 |
| 45 | 16A | 760 | 82.42 | 57.63 | 9.18 | 11.48 |
| 46 | 17A | 788 | 80.79 | 59.92 | 8.80 | 10.03 |
| 47 | 18A | 810 | 74.02 | 66.58 | 7.10 | 6.54 |
| 48 | 19A | 840 | 55.41 | 75.72 | 4.09 | 2.49 |
| 49 | 25A | 760 | 81.88 | 59.46 | 8.98 | 10.36 |
| 50 | 26A | 760 | 79.62 | 59.09 | 8.69 | 10.35 |
| 51 | 27A | 785 | 78.91 | 60.37 | 8.52 | 9.64 |
| 52 | 28A | 760 | 78.75 | 61.63 | 8.29 | 9.09 |
| 53 | 29A | 790 | 78.79 | 60.81 | 8.40 | 9.49 |
| 54 | 30A | 810 | 76.70 | 65.45 | 7.57 | 7.13 |
| 55 | 31A | 830 | 75.84 | 66.07 | 7.37 | 6.90 |

| EXAMPLE NO. | WT. % LIGHT CYCLE OIL YIELD | WT. % MATERIAL BALANCE | WT. % CYCLIC[3] | WT. % OLEFIN[4] | WT. % AROMATIC[5] | NAPHTHENES + OLEFIN[6] |
|---|---|---|---|---|---|---|
| 41 | 16.78 | 98.92 | 6.55 | 2.76 | 50.5 | 9.31 |
| 42 | 32.30 | 97.91 | 11.1 | 8.64 | 33.0 | 19.74 |
| 43 | 16.22 | [6]6.58 | 2.72 | 49.3 | 9.30 | |
| 44 | 31.50 | 98.44 | 11.25 | 8.55 | 33.2 | 19.80 |
| 45 | 13.58 | 97.17 | 6.04 | 2.44 | 54.7 | 8.48 |
| 46 | 14.62 | 97.56 | 6.19 | 2.33 | 54.8 | 8.52 |
| 47 | 18.99 | 98.12 | 7.71 | 3.19 | 47.9 | 10.90 |
| 48 | 31.56 | 98.43 | 11.71 | 8.23 | 35.8 | 19.94 |
| 49 | 12.51 | 97.38 | 7.03 | 2.57 | 56.7 | 9.6 |
| 50 | 13.27 | 98.97 | 7.44 | 3.32 | 54.2 | 10.46 |
| 51 | 13.69 | 98.00 | 7.85 | 3.16 | 53.5 | 11.01 |
| 52 | 13.99 | 97.85 | 0.0 | 0.0 | 0.0 | 0.0 |
| 53 | 13.63 | 97.50 | 0.0 | 0.0 | 0.0 | 0.0 |
| 54 | 15.98 | 97.58 | 0.0 | 0.0 | 0.0 | 0.0 |

TABLE J-continued

MAT PERFORMANCE FOR SAPO-37

| | | | | | | |
|---|---|---|---|---|---|---|
| 55 | 16.38 | 98.12 | 0.0 | 0.0 | 0.0 | 0.0 |

FOOTNOTES TO TABLE:
[1]Deactivation temperature in 1 atm steam for 2 hours
[2]Weight % gasoline yield/% mat conversion × 100
[3]Weight % napthenes in gasoline fraction
[4]Weight % olefins in gasoline fraction
[5]Weight % aromatics in gasoline fraction
[6]Napthenes + olefin content of gasoline

TABLE K

MAT PERFORMANCE FOR USY (ULTRASTABLE Y) CATALYSTS

| EXAMPLE NO. | CATALYST NO. | STEAM, °C.[1] | WT. % MAT CONVERSION | % GASOLINE SELCTIVITY[2] | WT. % GAS YIELD | WT. % COKE YIELD |
|---|---|---|---|---|---|---|
| 56 | 40A | 0 | 66.43 | 71.33 | 5.92 | 4.46 |
| 57 | 40A | 0 | 72.86 | 68.52 | 6.62 | 5.49 |
| 58 | 36A | 840 | 40.70 | 85.31 | 2.40 | 1.50 |
| 59 | 37A | 810 | 61.17 | 75.95 | 4.50 | 2.55 |
| 60 | 38A | 788 | 63.96 | 74.04 | 5.08 | 3.23 |
| 61 | 39A | 760 | 64.59 | 73.38 | 5.24 | 3.37 |
| 62 | 36A | 840 | 41.93 | 84.05 | 2.49 | 1.29 |

| EXAMPLE NO. | WT. % LIGHT CYCLE OIL YIELD | WT. % MATERIAL BALANCE | WT. % CYCLIC[3] | WT. % OLEFIN[4] | WT. % AROMATIC[5] | NAPHTHENES + OLEFIN[6] |
|---|---|---|---|---|---|---|
| 56 | 23.83 | 100.16 | | | | |
| 57 | 21.13 | 98.01 | | | | |
| 58 | 23.01 | 97.65 | 12.9 | 19.4 | 28.3 | 32.3 |
| 59 | 28.68 | 98.12 | 11.8 | 8.39 | 35.9 | 20.2 |
| 60 | 27.05 | 97.70 | 10.7 | 5.27 | 37.8 | 16.0 |
| 61 | 26.03 | 97.94 | 9.95 | 5.50 | 41.2 | 15.5 |
| 62 | 36.76 | 98.08 | 12.7 | 17.4 | 27.4 | 30.1 |

FOOTNOTES TO TABLE:
[1]Deactiviation temperature in 1 atm steam for 2 hours
[2]Weight % gasoline yield/% mat conversion × 100
[3]Weight % naphthenes in gasoline fraction
[4]Weight % olefins in gasoline fraction
[5]Weight % aromatics in gasoline fraction
[6]Naphthenes + olefin content of gasoline

TABLE L

MAT PERFORMANCE FOR CREY CATALYSTS

| EXAMPLE NO. | CATALYST NO. | STEAM, °C.[1] | WT. % MAT CONVERSION | % GASOLINE SELECTIVITY[2] | WT. % GAS YIELD | WT. % COKE YIELD |
|---|---|---|---|---|---|---|
| 63 | 32A | 760 | 71.57 | 70.48 | 6.18 | 5.37 |
| 64 | 33A | 788 | 72.33 | 71.20 | 6.19 | 5.02 |
| 65 | 34A | 810 | 71.81 | 71.39 | 6.06 | 5.23 |
| 66 | 35A | 830 | 63.41 | 75.81 | 4.64 | 3.25 |

| EXAMPLE NO. | WT. % LIGHT CYCLE OIL YIELD | WT. % MATERIAL BALANCE | WT. % CYCLIC[3] | WT. % OLEFIN[4] | WT. % AROMATIC[5] | NAPHTHENES + OLEFIN[6] |
|---|---|---|---|---|---|---|
| 63 | 19.59 | 97.49 | 11.1 | 4.42 | 40.8 | 15.52 |
| 64 | 19.00 | 94.97 | 11.4 | 4.33 | 42.0 | 15.73 |
| 65 | 19.89 | 97.61 | 1 | | | |
| 66 | 24.57 | 97.38 | 12.5 | 6.53 | 36.6 | 19.03 |

FOOTNOTES TO TABLE:
[1]Deactiviation temperature in 1 atm steam for 2 hours
[2]Weight % gasoline yield/% mat conversion × 100
[3]Weight % naphthenes in gasoline fraction
[4]Weight % olefins in gasoline fraction
[5]Weight % aromatics in gasoline fraction
[6]Naphthenes + olefin content of gasoline

TABLE M

MAT PERORMANCE FOR SAPO-37 COMPOSITE CATALYSTS OF THE INVENTION

| EXAMPLE NO. | CATALYST NO. | STEAM, °C.[1] | WT. % MAT CONVERSION | % GASOLINE SELECTIVITY[2] | WT. % GAS YIELD | WT. % COKE YIELD |
|---|---|---|---|---|---|---|
| 67 | 69.40 | | 72.36 | 5.74 | 4.04 | |
| 68 | 1B | 785 | 69.98 | 65.81 | 6.50 | 7.33 |
| 69 | 1C | 810 | 57.40 | 75.86 | 4.12 | 2.56 |
| 70 | 1D | 840 | 31.26 | 82.44 | 1.76 | 1.72 |
| 71 | 2A | 760 | 79.57 | 64.63 | 7.97 | 7.56 |
| 72 | 2B | 785 | 76.55 | 68.09 | 6.98 | 6.15 |
| 73 | 2C | 810 | 69.50 | 72.34 | 5.78 | 3.86 |
| 74 | 2D | 840 | 40.15 | 82.45 | 2.40 | 1.69 |
| 75 | 3A | 760 | 66.82 | 75.31 | 5.09 | 2.86 |

TABLE M-continued
MAT PERORMANCE FOR SAPO-37 COMPOSITE CATALYSTS OF THE INVENTION

| | | | | | | |
|---|---|---|---|---|---|---|
| 76 | 6A | 760 | 77.24 | 69.45 | 7.09 | 5.14 |
| 77 | 7A | 760 | 74.56 | 70.05 | 6.68 | 5.06 |
| 78 | 4A | 760 | 75.08 | 65.34 | 7.33 | 6.92 |
| 79 | 4B | 785 | 74.98 | 66.38 | 7.12 | 6.59 |
| 80 | 4C | 810 | 68.03 | 71.29 | 5.77 | 4.16 |
| 81 | 4D | 840 | 53.41 | 76.63 | 3.75 | 2.21 |
| 82 | 5A | 760 | 79.80 | 63.96 | 8.25 | 7.59 |
| 83 | 5B | 785 | 76.65 | 64.39 | 7.70 | 7.30 |
| 84 | 5C | 810 | 69.25 | 69.89 | 6.11 | 4.70 |
| 85 | 5D | 840 | 56.64 | 77.70 | 3.84 | 2.25 |
| 86 | 8A | 760 | 78.51 | 65.86 | 7.72 | 6.97 |
| 87 | 10A | 760 | 74.58 | 70.32 | 6.65 | 4.90 |
| 88 | 10B | 790 | 73.49 | 70.07 | 6.58 | 4.88 |
| 89 | 10C | 810 | 71.83 | 71.63 | 6.11 | 4.43 |
| 90 | 10D | 840 | 68.21 | 74.20 | 5.36 | 3.39 |

| EXAMPLE NO. | WT. % LIGHT CYCLE OIL YIELD | WT. % MATERIAL BALANCE | WT. % CYCLIC[3] | WT. % OLEFIN[4] | WT. % AROMATIC[5] | NAPHTHENES + OLEFIN[6] |
|---|---|---|---|---|---|---|
| 67 | 22.27 | 99.21 | 11.58 | 4.83 | 38.2 | 16.4 |
| 68 | 20.84 | 104.27 | 11.13 | 5.25 | 41.7 | 16.3 |
| 69 | 27.52 | 99.34 | 13.2 | 8.93 | 32.7 | 22.1 |
| 70 | 33.73 | 98.97 | 14.0 | 19.6 | 25.8 | 33.6 |
| 71 | 15.64 | 99.91 | 8.88 | 2.88 | 47.4 | 11.8 |
| 72 | 17.88 | 100.06 | 9.74 | 3.26 | 43.2 | 13.0 |
| 73 | 22.20 | 98.09 | 11.04 | 5.06 | 38.2 | 16.1 |
| 74 | 32.27 | 98.61 | 14.0 | 16.61 | 26.4 | 30.6 |
| 75 | 22.81 | 97.42 | 12.4 | 6.59 | 36.6 | 18.9 |
| 76 | 16.48 | 96.04 | 9.99 | 3.57 | 44.7 | 13.5 |
| 77 | 17.92 | 97.04 | 9.81 | 3.57 | 43.8 | 13.3 |
| 78 | 17.74 | 99.86 | 9.66 | 4.62 | 44.4 | 14.28 |
| 79 | 18.06 | 99.12 | 9.62 | 4.47 | 43.9 | 14.09 |
| 80 | 22.64 | 99.66 | 10.98 | 5.08 | 38.3 | 16.06 |
| 81 | 29.28 | 99.41 | 13.27 | 9.78 | 32.3 | 23.05 |
| 82 | 15.27 | 98.46 | 8.22 | 3.19 | 46.6 | 11.41 |
| 83 | 16.80 | 98.38 | 9.16 | 3.59 | 45.7 | 12.75 |
| 84 | 21.11 | 99.52 | 10.5 | 4.86 | 40.7 | 15.36 |
| 85 | 29.51 | 99.41 | 13.0 | 9.64 | 31.9 | 22.64 |
| 86 | 15.32 | 99.11 | 8.90 | 3.10 | 48.6 | 12.00 |
| 87 | 18.31 | | | | | |
| 88 | 18.58 | | | | | |
| 89 | 19.70 | | | | | |
| 90 | 21.73 | | | | | |

Figure 2:
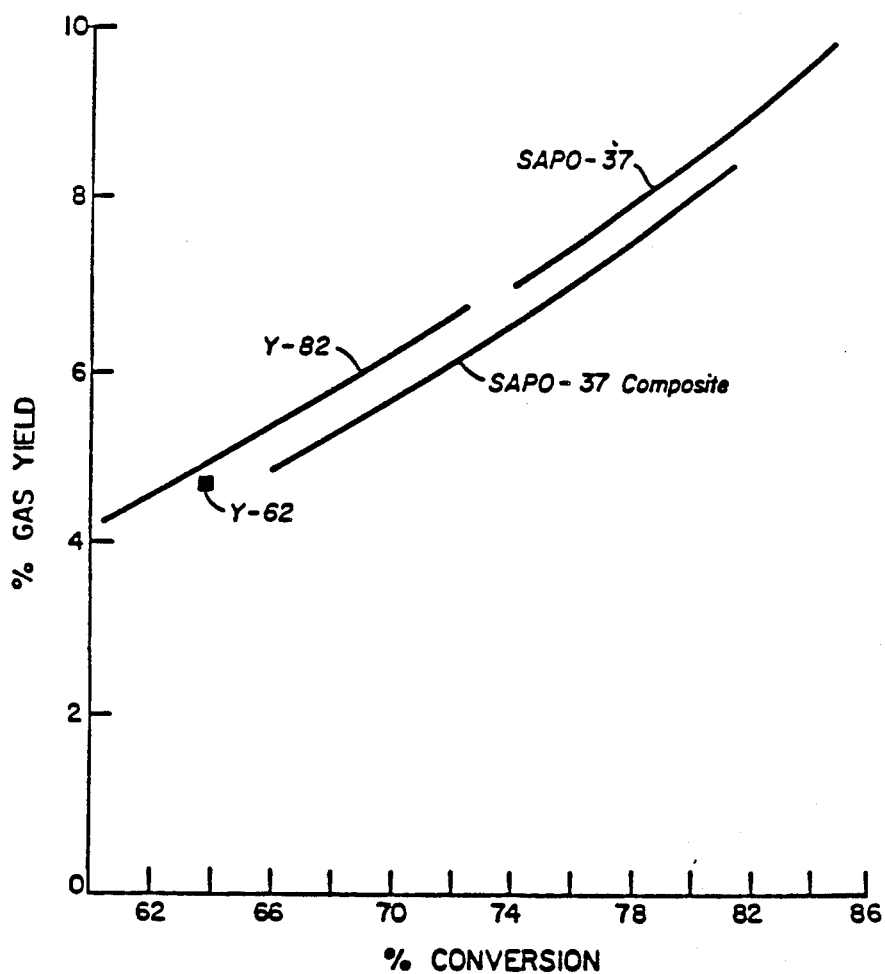
Figure 3:
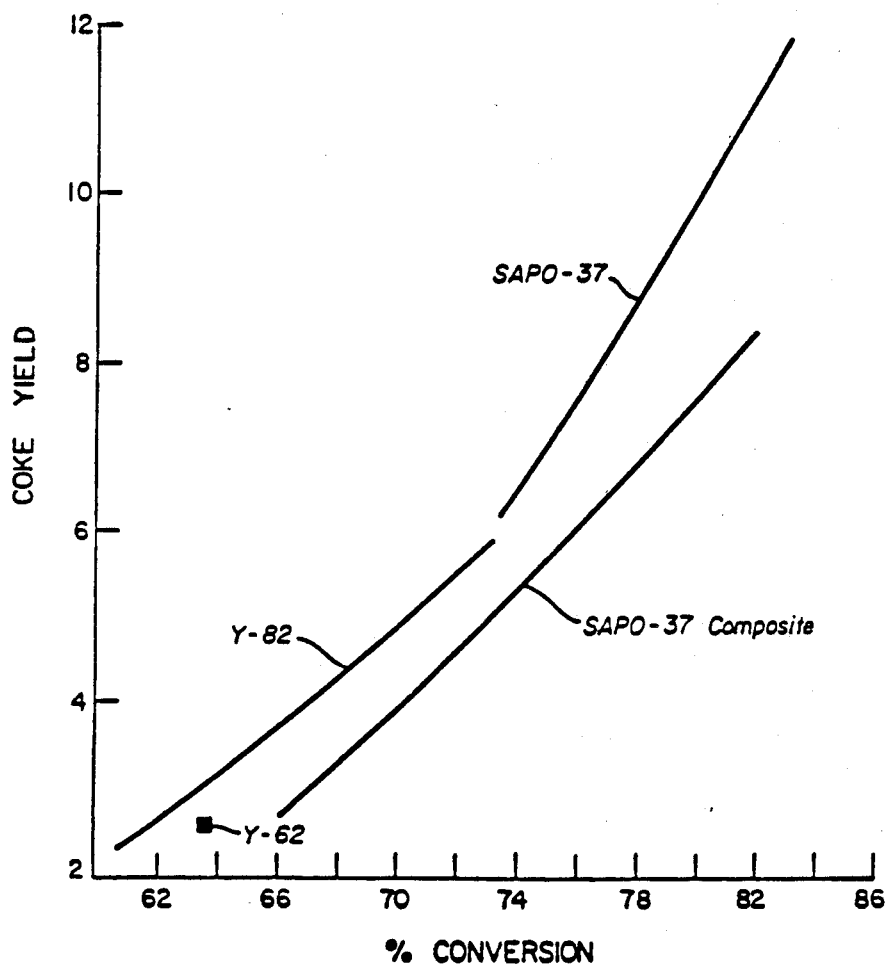
Figure 4:
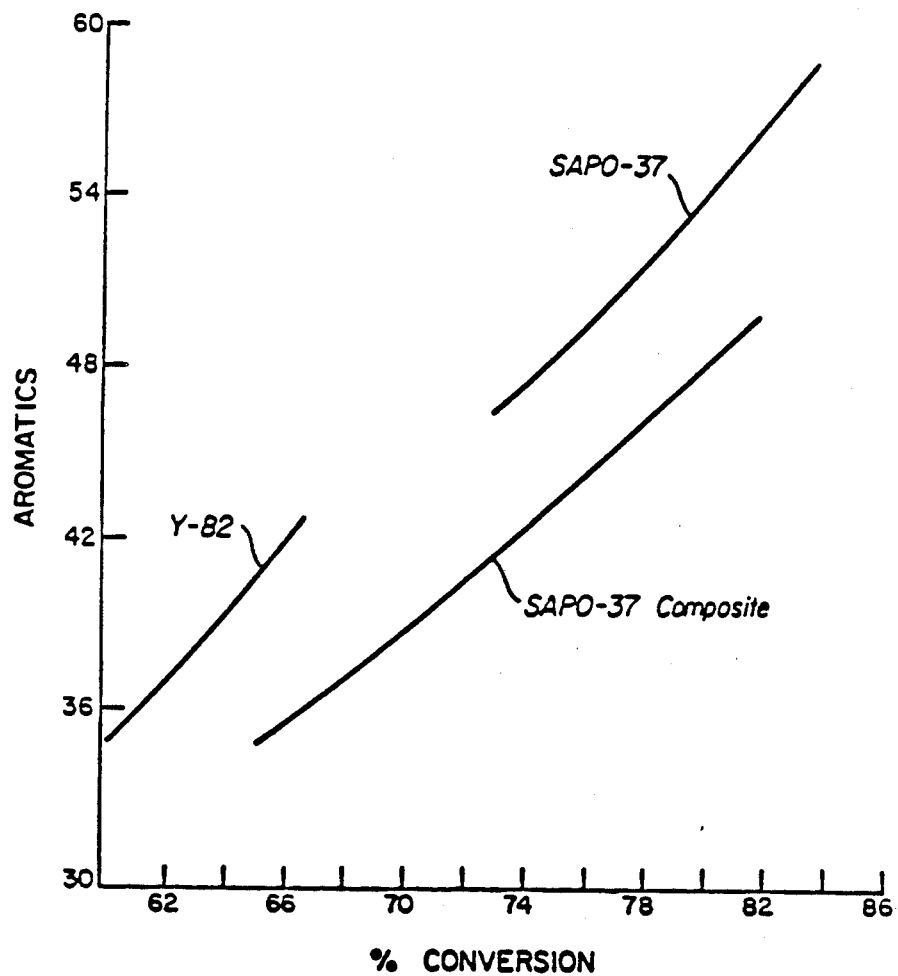
Figure 5:
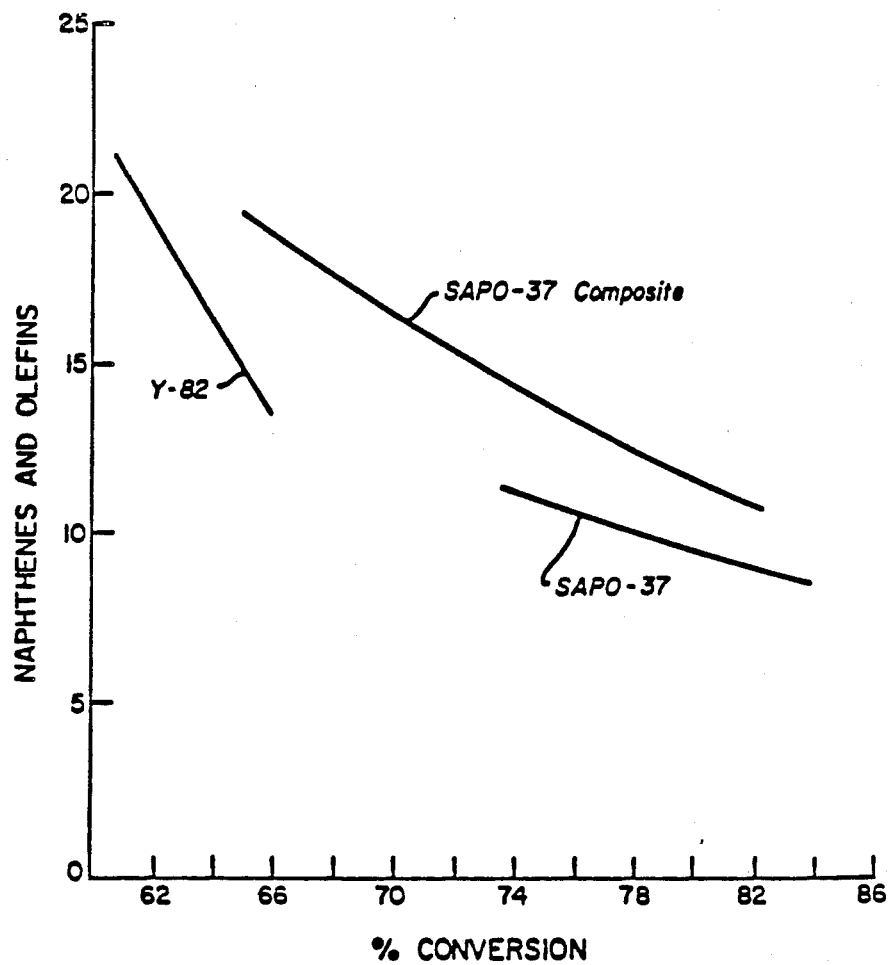

FOOTNOTES TO TABLE:
[1] Deactivation temperature in 1 atm steam for 2 hours
[2] Weight % gasoline yield/% mat conversion × 100
[3] Weight % naphthenes in gasoline fraction
[4] Weight % olefins in gasoline fraction
[5] Weight % aromatics in gasoline fraction
[6] Naphthenes + olefin content of gasoline The drawings serve to simplify the analysis of the data in the foregoing tables J through M. The curves presented in the drawings, FIGS. 1–5, are based on an interpretive analysis of the data points for catalysts other than the 20 and 24 hour digestion period samples and the trends thereby shown. FIG. 1 demonstrates higher gasoline selectivity across a broad range of conversion demonstrating superior gasoline selectivity for the catalysts of the invention over a conventional ultrastable Y zeolitic molecular sieve, both Y-62 and Y-82, and over non-composited SAPO-37. FIG. 2 demonstrates lower gas yield over the ranges occupied by the aforementioned ultrastable Y zeolitic molecular sieves and the non-composited SAPO-37. FIG. 3 shows that the SAPO-37 composites of the invention generate a substantially lower coke yield over the full range of conversion. In respect to the formation of aromatics, FIG. 4 shows that the SAPO-37 composite generated less aromatics than Y-82 and the non-composited SAPO-37. However, FIG. 5 demonstrates the capacity of the SAPO-37 composite to significantly enhance the octane rating by producing a significantly higher naphthenes and olefins content over the commercial ranges of conversion as compared to Y-82 and the non-composited SAPO-37. The foregoing relates to the superiority of the SAPO-37 composites of the invention as cracking and octane boosting catalysts.

EXAMPLE 91

(a) An initial mixture was prepared by adding 43.5 grams of a hydrated aluminum oxide (70.6 wt. % $Al_2O_3$, 29.6 wt. % LOI, pseudo-boehmite) gradually to 57.5 grams of 85% orthophosphoric acid in 119.3 grams of $H_2O$ and stirring until uniform. To this mixture a suspension was added comprised of 12.2 grams of Cab-O-Sil EH5 in a 5.7 grams tetramethylammonium hydroxide (TMAOH)/197.4 grams 40% aqueous tetrapropylammoniumhydroxide (TPAOH) solution and stirred till homogeneous. The composition of this reaction mixture, in terms of molar oxide ratios, was:

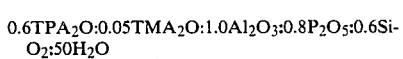

Finally, 36.6 grams of $NH_4Y$ zeolite was added and thoroughly mixed. The reaction mixture was placed in a 0.6 liter stirred stainless steel pressure reactor and was heated with stirring to 200° C. in 1 hour and maintained at 200° C. for 5 hours. The solids were recovered by centrifugation, washed with water, dried at 100° C. and rehydrated at room temperature at 50% humidity. The product recovered weighed 77.2 grams. The chemical composition was found to be 26.4 wt % $Al_2O_3$, 20.5 wt % $P_2O_5$, 24.7 wt % $SiO_2$, 9.3 wt % C, 2.7 wt % N, and 27.4 wt % LOI which corresponds to an empirical chemical composition (calcined, anhydrous basis) of:

$$(Al_{0.425}P_{0.237}Si_{0.338})O_2$$

The solids were subjected to x-ray analysis; the x-ray powder diffraction pattern corresponded to well crystallized SAPO-37/Y zeolite composite.

We claim:

1. A fluid catalytic cracking process comprising contacting, at effective catalytic cracking conditions, a crude oil feedstock with a cracking catalyst comprising an effective amount of a microporous crystalline multi-compositional, multiphase composite comprising different inorganic microporous crystalline molecular sieve compositions as phases thereof, having at least two phases wherein at least one phase is grown by crystal growth in the presence of another phase, wherein said other phase is a deposition substrate, in which:

(a) the different phases are contiguous and have a common crystal framework structure;

(b) at least one phase is an acidic non-zeolitic molecular sieve, NZMS-37 composition which contains aluminum and phosphorus and another element possessing a valence below 4 in its framework structure, and (c) the composite exhibits a distinct heterogeneity in composition from one phase to another therein.

* * * * *